United States Patent [19]
Resnick

[11] Patent Number: 5,949,853
[45] Date of Patent: *Sep. 7, 1999

[54] EXTENSION DEVICE FOR A COMPUTER SYSTEM

[75] Inventor: Russell A. Resnick, Raleigh, N.C.

[73] Assignee: International Business Machines Corporation, Armonk, N.Y.

[*] Notice: This patent is subject to a terminal disclaimer.

[21] Appl. No.: 08/807,937

[22] Filed: Feb. 28, 1997

[51] Int. Cl.$^6$ ...................................................... H04M 1/64
[52] U.S. Cl. ................. 379/67.1; 379/90.01; 379/102.02
[58] Field of Search .............................. 379/90.01, 90.02, 379/92.04, 93.01, 93.05, 93.06, 93.15, 93.17, 93.18, 93.26, 93.28, 93.24, 88.13, 88.14, 88.18, 102.01, 102.02, 102.03

[56] References Cited

U.S. PATENT DOCUMENTS

| | | | |
|---|---|---|---|
| 4,524,244 | 6/1985 | Faggin et al. | 379/93.09 |
| 4,571,457 | 2/1986 | Hattori et al. | 179/2 EA |
| 4,578,537 | 3/1986 | Faggin et al. | 379/93.09 |
| 4,686,699 | 8/1987 | Wilkie | 379/93.5 |
| 4,813,069 | 3/1989 | Tanaka et al. | 379/82 |
| 4,881,259 | 11/1989 | Scordato | 379/58 |
| 5,142,564 | 8/1992 | Chu | 379/67 |
| 5,283,819 | 2/1994 | Glick | 379/93.01 |
| 5,333,152 | 7/1994 | Wilber | 379/102.04 |
| 5,515,423 | 5/1996 | Beck et al. | 379/100.12 |
| 5,544,768 | 8/1996 | Lemaire et al. | 379/88.14 |
| 5,566,232 | 10/1996 | Sizer, II | 379/102.03 |
| 5,572,576 | 11/1996 | Klausner et al. | 379/88.12 |
| 5,754,306 | 5/1998 | Taylor et al. | 358/400 |
| 5,794,058 | 8/1998 | Resnick | 395/750.05 |

*Primary Examiner*—Curtis A. Kuntz
*Assistant Examiner*—Melur Ramakrishnaiah
*Attorney, Agent, or Firm*—Anthony N. Magistrale

[57] ABSTRACT

Disclosed is an extension device for use with a computer system which includes a memory for storing an application program which can perform at least one software function. A modem is operative to encode the at least one software function to first tone signals and transfer the first tone signals onto a telephone line. The modem is further operative to decode second tone signals received from the telephone line and transfer the first tone signals in response thereto. The second tone signals are operative to control the at least one software function. The extension device includes a user operable keypad for inputting command signals corresponding to the at least one software function. A display is included on the extension device for displaying information related to the at least one software function. The extension device also includes a controller which is coupled to and controls the keypad, display, a signal generator and a signal decoder. The controller and signal generator are operative to convert the command signals to the second tone signals. The controller and signal decoder are operative to decode the first tone signals to control the extension device to operate in accordance with the at least one software function.

15 Claims, 13 Drawing Sheets

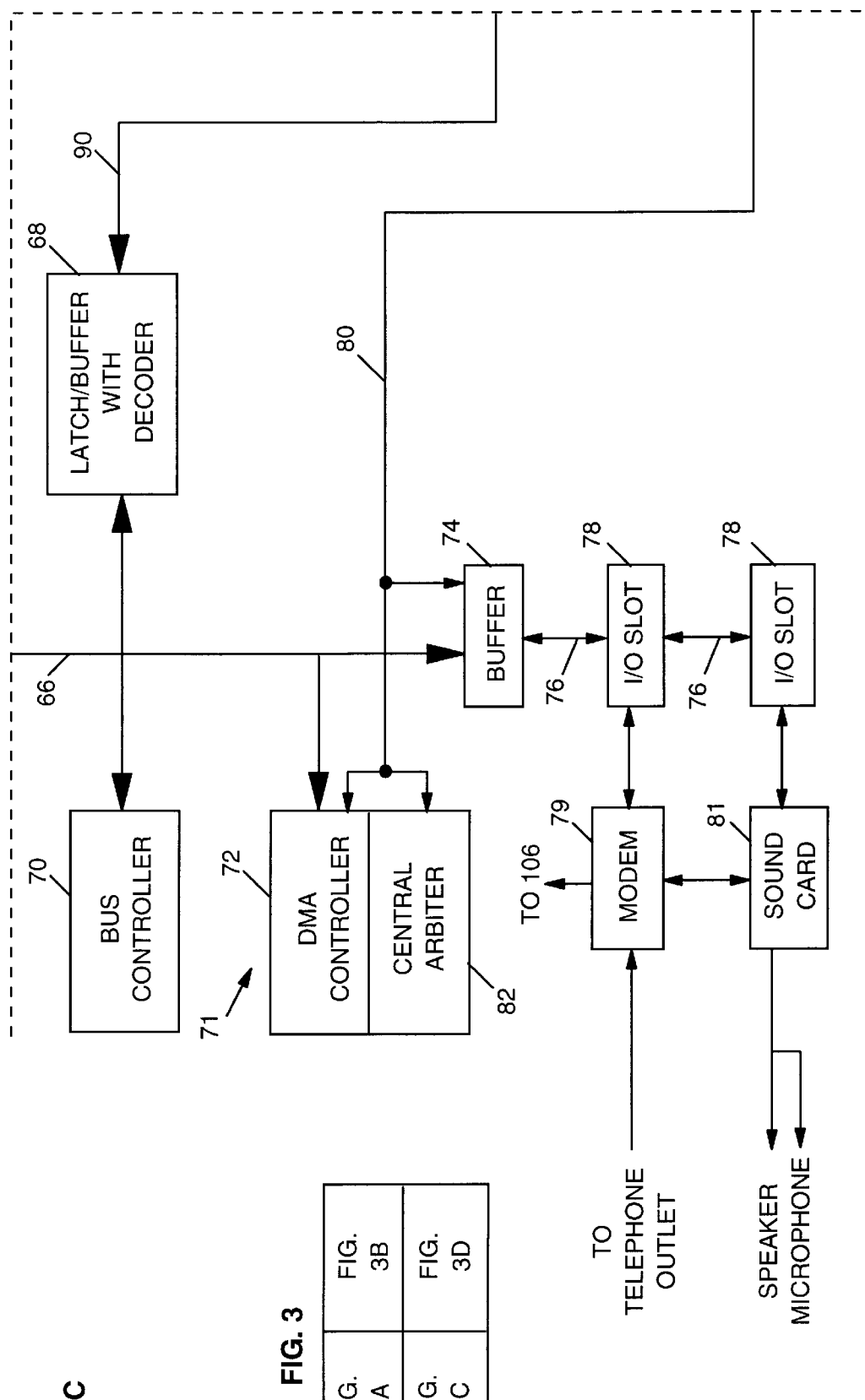

EXTENSION DEVICE FOR A COMPUTER SYSTEM

BACKGROUND OF THE INVENTION

1. Field of the Invention

The present invention relates to computer systems and more particularly to an extension device and a computer system wherein the extension device is operative to control and operate in accordance with an application program stored in the computer system.

2. Description of Related Art

Personal computer systems are well known in the art. Personal computer systems in general, and IBM Personal Computers in particular, have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including all RAM and BIOS ROM, a system monitor, a keyboard, one or more flexible diskette drives, a CD-ROM drive, a fixed disk storage drive (also known as a "hard drive"), a so-called "mouse" pointing device, and an optional printer. One of the distinguishing characteristics of these systems is the use of a motherboard or system planar to electrically connect these components together. Examples of such personal computer systems are IBM's Personal Computer AT and IBM's Aptiva.

Personal computer systems are typically used to run software to perform such diverse activities as word processing, telephone and answering machine functions, manipulation of data via spreadsheets, collection and relation of data in databases, displays of graphics, design of electrical or mechanical systems using system-design software, etc. As a result of the wide range of functions that can be performed by today's personal computers, users are faced with a myriad of computer features when they are shopping for a computer. One such feature is a telephone answering machine function.

The telephone answering machine function can be provided by a software program such as Ring Central which is available from Ring Zero, Inc. When this program is executed on a computer system it typically provides a graphical user interface (GUI) screen which resembles a telephone handset and answering machine. The user can use a mouse or other input device to operate the telephony software. The GUI and program provide most functions of a normal phone/answering machine combination such as allowing the user to initiate, answer and conduct a phone conversation with another party when the system is in a normal operating state (via a microphone (not shown) and speaker (not shown) attached to system's console), record message(s) when the user is not there, indicate the number of recorded messages and playback the message(s). The user's pre-recorded message which plays when the program acts like an answering machine as well as the messages which are received from a caller are digitized and stored on the computer's hard drive by a sound card within the system.

Many computer users, however, do not use the telephony functions on their computers because the computer is in an inconvenient place in the house to be used as an answering machine.

It is therefore desirable to provide an extension device for a computer system that allows a user to use and access the computer system's answering machine software without having to physically be near the computer system in the house.

SUMMARY OF THE INVENTION

The present invention is directed to an extension device and a computer system capable of operating in any selected one of at least two states of power management, namely a normal operating state in which code is executed normally by said computer system and an off state. The computer system includes a central processing unit (CPU) capable of executing application program code and operating system code. The system further includes a memory for storing an application program which can perform at least one software function. A modem is in circuit communication with the CPU and a telephone line. The modem is operative to encode the at least one software function to first tone signals and transfer the first tone signals onto the telephone line. The modem is further operative to decode second tone signals received from the telephone line and transfer the first tone signals in response thereto. The second tone signals are operative to control the at least one software function. The application program is operative to control the modem to (1) encode the at least one software function and (2) decode the second tone signals.

The extension device includes a user operable keypad for inputting command signals corresponding to the at least one software function. A display is included on the extension device for visually displaying lo the user information related to the at least one function performed by the program. A signal generator is coupled to the telephone line for generating the second tone signals and a signal decoder is coupled to the telephone line for decoding the first tone signals to a format which can be used by a controller. The controller is coupled to and controls the keypad, display, signal generator and signal decoder. The controller and signal generator are responsive to the command signals and operative to convert the command signals to the second tone signals. The controller and signal decoder are operative to decode the first tone signals to control the extension device to operate in accordance with the at least one software function.

In a further embodiment of the present invention, the application program and modem are operative to automatically answer an incoming phone call when a ring signal is present on the telephone line, play a pre-recorded greeting and store an incoming message as digitized audio signals in the computer's memory when the system is in the normal operating state. In this embodiment, the at least one software function includes playing back the incoming messages on the extension device.

BRIEF DESCRIPTION OF THE DRAWINGS

FIGS. 3A, 3B, 3C and 3D show a block diagram of certain components of the personal computer of FIGS. 1 and 2;

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. This application is written for those very familiar with all aspects of computer system design.

Figure 1:
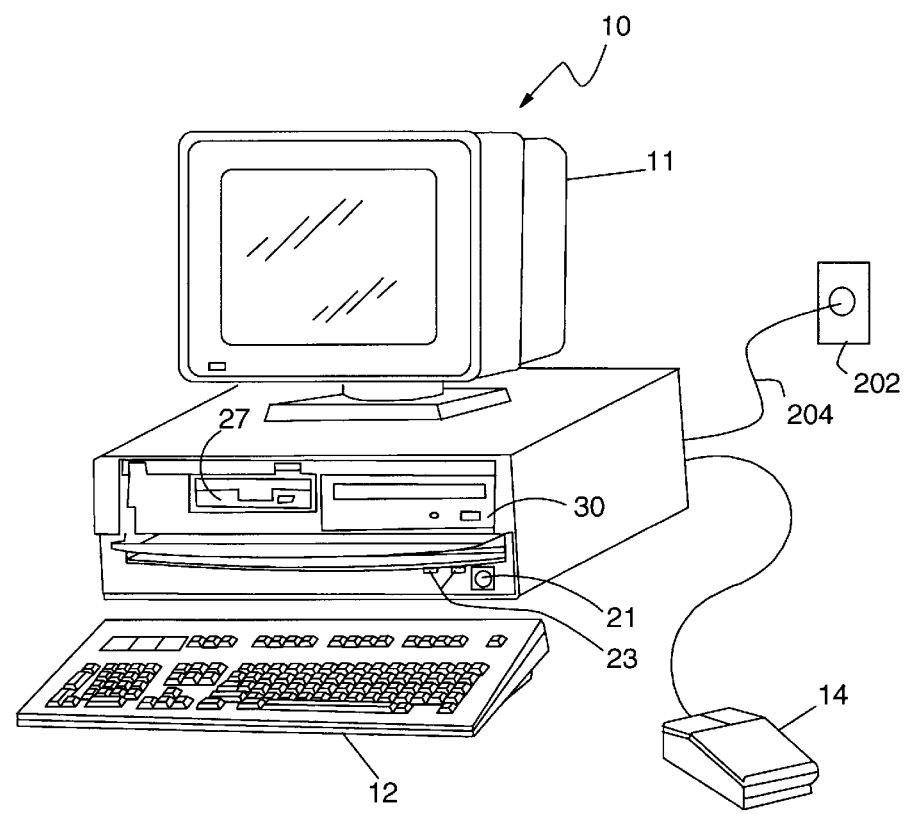
FIG. 1 is a perspective view of a personal computer having telephony software in accordance with the present invention.

Referring now more particularly to the accompanying drawings, a computer system embodying the present invention is there shown and generally indicated at 10 (FIG. 1). As mentioned hereinabove, the computer 10 may have an associated display monitor 11, keyboard 12, mouse 14, and printer or plotter (not shown). The computer 10 has a cover 15 which is a decorative outer member (FIG. 2) and a back plate shield member 18 which cooperate with a chassis 19 in defining an enclosed, shielded volume for receiving electrically powered data processing and storage components for processing and storing digital data. At least certain of these components are mounted on a multi layer planar 20 or motherboard which is mounted on the chassis 19 and provides a means for electrically interconnecting the components of the computer 10 including those identified above and such other associated elements as floppy disk drives, various forms of direct access storage devices, accessory adapter cards or boards, and the like. As pointed out more fully hereinafter, provisions are made in the planar 20 for the passage of input/output signals to and from the operating components of the microcomputer.

Figure 2:
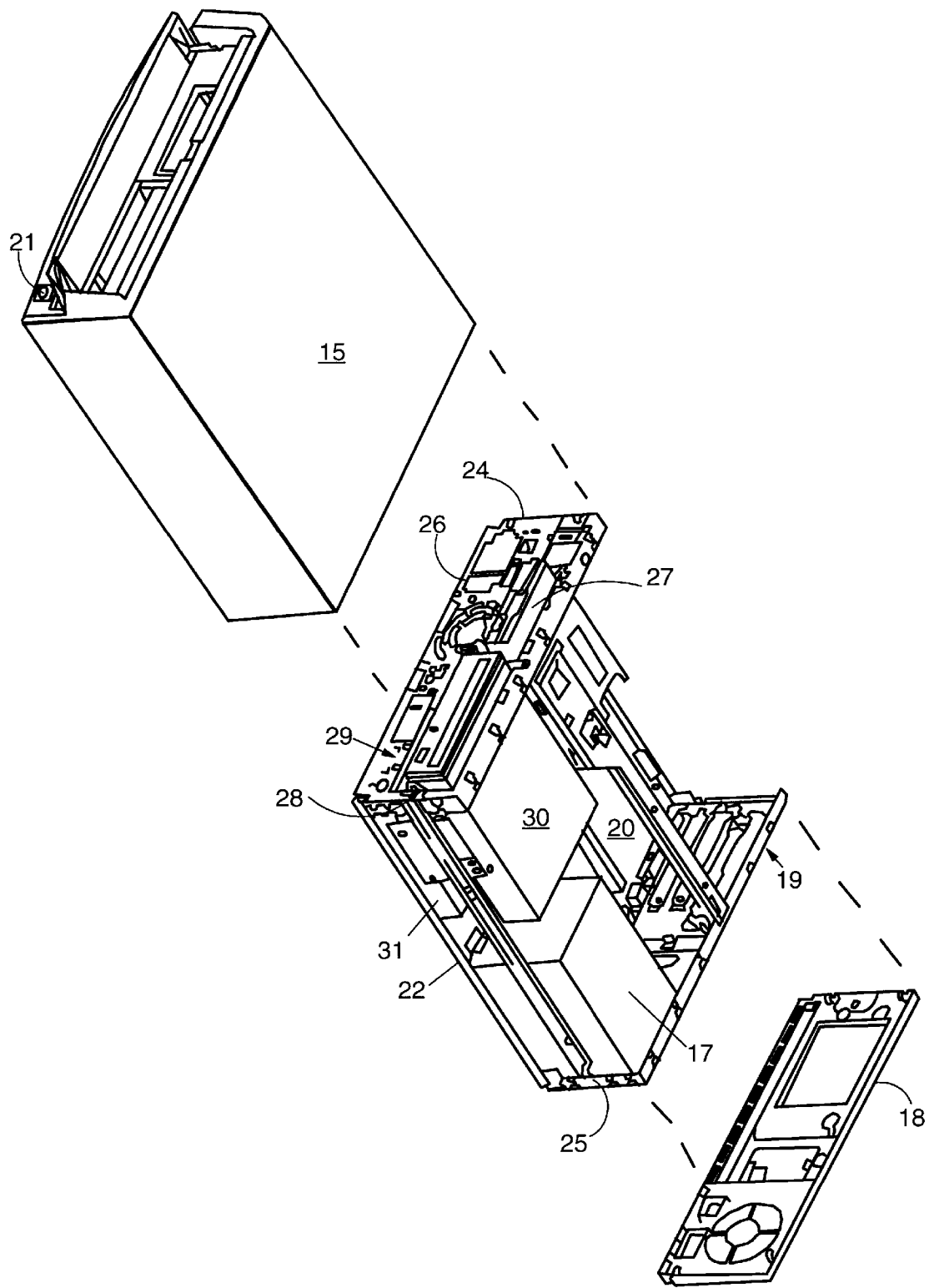
FIG. 2 is an exploded perspective view of certain elements of the personal computer of FIG. 1 including a chassis, a cover, a direct access storage device and a planar board and illustrating certain relationships among those elements.

The system 10 has a power supply 17, a power button 21, also herein referred to as switch 21, and power/feedback LED 23. Unlike in the usual power switch in a typical system, the switch 21 does not switch AC line power to and from the power supply 17, as will be explained below. The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a lower bay 29 are provided. One of the upper bays 26 is adapted to receive peripheral drives of a first size (such as those known as 3.5 inch drives) while the other 28 is adapted to receive drives of a different size (such as a CD ROM drive) and the lower bay is adapted to receive another drive. One floppy disk drive is indicated at 27 in FIGS. 1 and 2, and is a removable medium direct access storage device (DASD) capable of receiving a diskette inserted there into and using the diskette to receive, store and deliver data as is generally known. One CD ROM drive is indicated at 30 in FIGS. 1 and 2 and is a removable medium direct access storage device capable of receiving a compact disc inserted there into and using the disc to deliver data as is generally known. One hard disk drive is indicated at 31 in FIG. 2 and is a fixed medium direct access storage device capable of storing and delivering data as is generally known.

Prior to relating the above structure to the present invention, a summary of the operation in general of the computer system 10 may merit review. Referring to FIGS. 3A, 3B, 3C and 3D there is shown a block diagram of a computer system illustrating the various components of the computer system such as the system 10 in accordance with the present invention, including components mounted on the planar 20 and the connection of the planar to the I/O slots and other hardware of the personal computer system. Connected to the planar is the system processor 40, also herein CPU 40, comprised of a microprocessor, which is connected by a high speed CPU local bus 42 through a memory control unit 46, which is further connected to a volatile random access memory (RAM) 53. The memory control unit 46 is comprised of a memory controller 48, an address multiplexer 50, and a data buffer 52. The memory control unit 46 is further connected to a random access memory 53 as represented by the four RAM modules 54. The memory controller 48 includes the logic for mapping addresses to and from the microprocessor 40 to particular areas of RAM 53. This logic is used to reclaim RAM previously occupied by BIOS. Further generated by memory controller 48 is a ROM select signal (ROMSEL), that is used to enable or disable ROM 88.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor 40 could be an Intel Pentium processor, Cyrix 586-P75 processor or Advanced Micro Devices 8486 processor or any other microprocessor that has a system management interrupt (SMI). As used herein, reference to an "SL" enhanced microprocessor generally intends such a microprocessor.

Returning now to FIG. 3, the CPU local bus 42 (comprising data, address and control components, not shown) provides for the connection of the microprocessor 40, a math coprocessor 44 (if not internal to the CPU 40), a video controller 56, a system cache memory 60, and a cache controller 62. The video controller 56 has associated with it a monitor (or video display terminal) 11 and a video memory 58. Also coupled on the CPU local bus 42 is a buffer 64. The buffer 64 is itself connected to a slower speed (compared to the CPU local bus 42) system bus 66, also comprising address, data and control components. The system bus 66 extends between the buffer 64 and a further buffer 68. The system bus 66 is further connected to a bus control and timing unit 70 and a DMA unit 71. The DMA unit 71 is comprised of a central arbiter 82 and a DMA controller 72. An additional buffer 74 provides an interface between the system bus 66 and an optional feature bus such as the Industry Standard Architecture (ISA) bus 76. Connected to the bus 76 are a plurality of I/O slots 78 for receiving ISA adapter cards. One such ISA adapter card is an internal modem 79. The modem 79 is connected to a typical telephone outlet and to power management circuitry 106. Another adapter card is sound card 81 which is connected to the modem 79 for transmitting audio signals therebetween. In addition, the sound card is coupled (via jacks) to speakers (not shown) and a microphone (not shown). Additional ISA adapter cards can be pluggably connected to the I/O slots 78 and may provide additional I/O devices or memory for the system 10.

An arbitration control bus 80 couples the DMA controller 72 and central arbiter 82 to the I/O slots 78, a diskette adapter 84, and an Integrated Drive Electronics (IDE) fixed disk controller 86.

While the microcomputer system 10 is shown with a basic 4 megabyte RAM module 53, it is understood that additional memory can be interconnected as represented in FIG. 3 by the addition of optional higher-density memory modules 54. For purposes of illustration only, the present invention is described with reference to the basic four megabyte memory module.

Figure 6A:
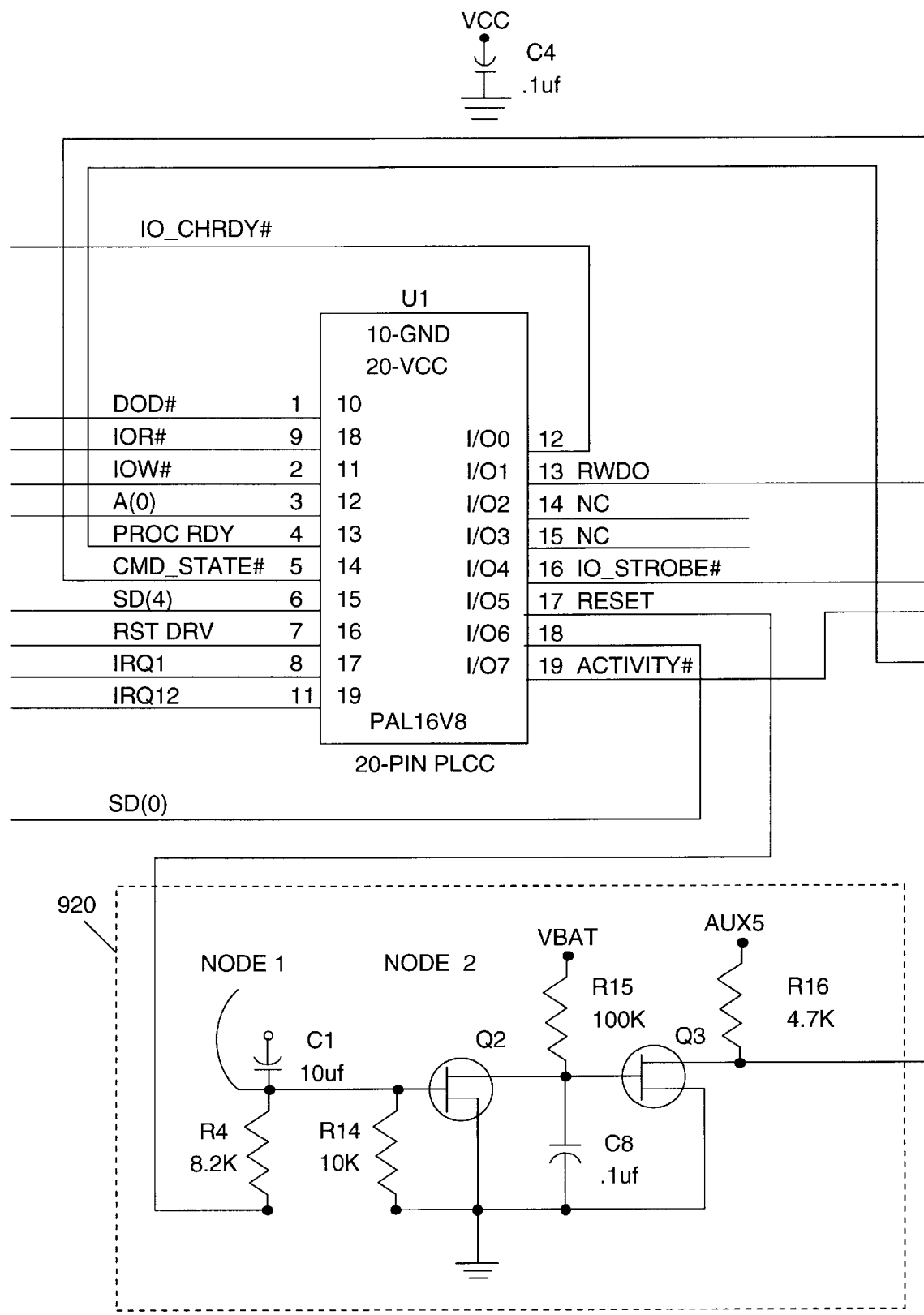
FIG. 6A, 6B and 6C are electrical schematic diagrams of the power management circuitry in accordance with the present invention, showing the various interfaces to other Figures.
Figure 6B:
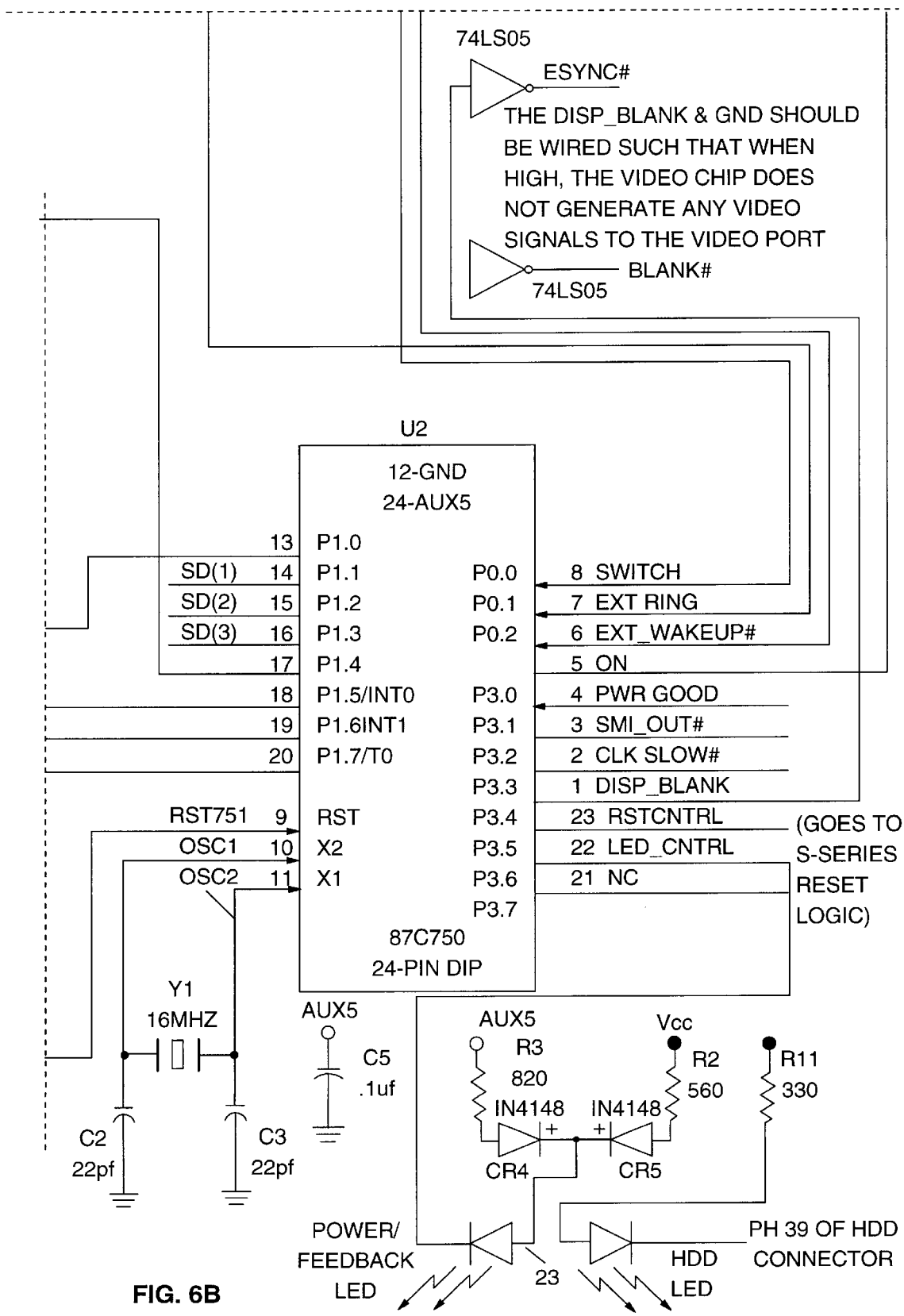
Figure 6C:
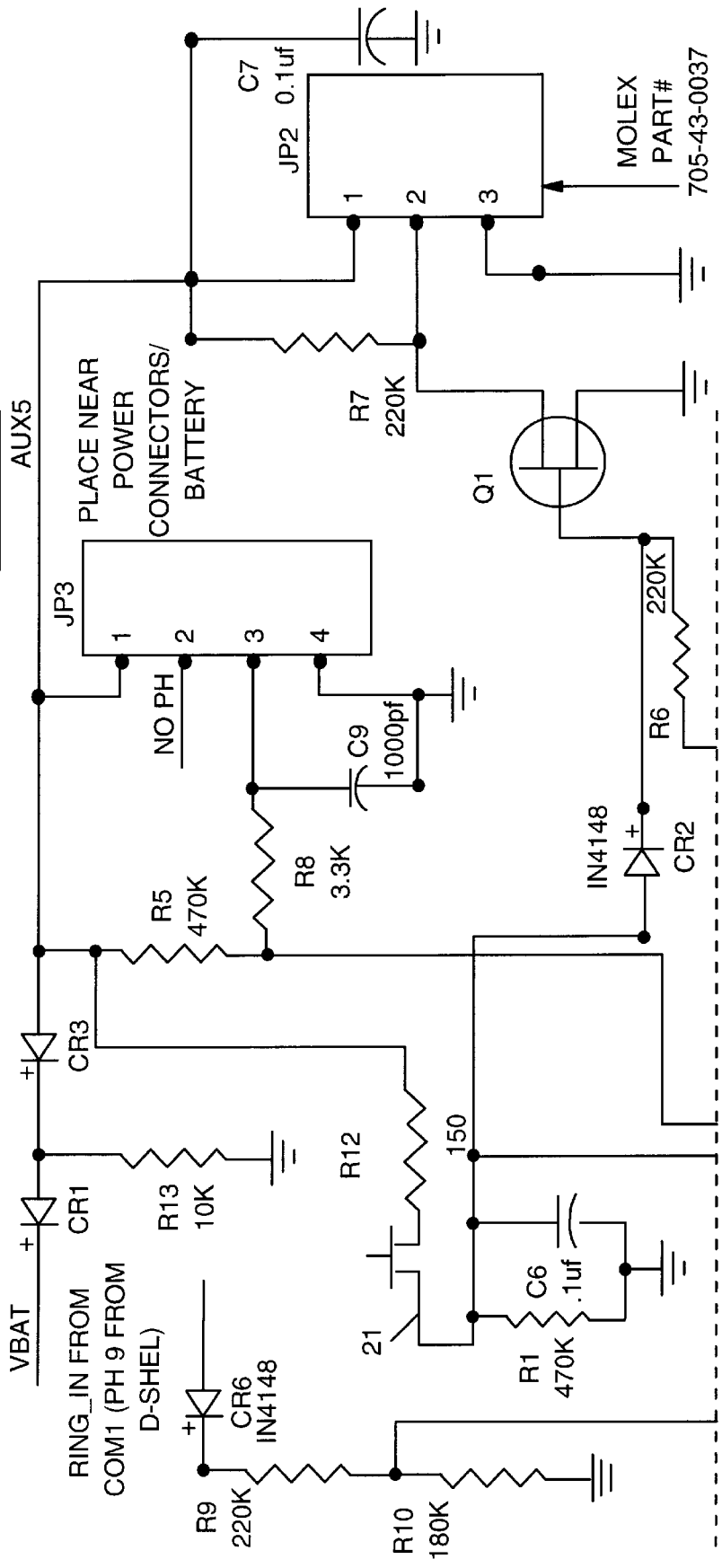

A latch buffer 68 is coupled between the system bus 66 and a planar I/O bus 90. The planar I/O bus 90 includes address, data, and control components respectively. Coupled along the planar I/O bus 90 are a variety of I/O adapters and other components such as the diskette adapter 84, the IDE disk adapter 86, an interrupt controller 92, an RS-232 adapter 94, nonvolatile CMOS RAM 96, also herein referred to as NVRAM 96, a CMOS real-time clock (RTC) 98, a parallel adapter 100, a plurality of timers 102, the read only memory (ROM) 88, the 8042 104, and the power management circuitry 106. The 8042, shown at 104, is the slave processor that interfaces with the keyboard 12 and the mouse 14. The power management circuitry 106 is in circuit communication with the power supply 17, the switch 21, the power/feedback LED 23, and the internal modem 79 and/or an optional external modem 83. The external modem is typically connected to a transformer 85, which is connected to a typical wall outlet, as is known to those skilled in the art. The modems 79, 83 are connected to a typical telephone outlet. The power management circuitry 106 is shown in FIG. 6 and is more fully described in the text accompanying FIGS. 6 and 7.

The read only memory 88 includes the BIOS that is used to interface between the I/O devices and the operating system of the microprocessor 40. BIOS stored in ROM 88 can be copied into RAM 53 to decrease the execution time of BIOS. ROM 88 is further responsive (via ROMSEL signal) to memory controller 48. If ROM 88 is enabled by memory controller 48, BIOS is executed out of ROM. If ROM 88 is disabled by memory controller 48, ROM is not responsive to address inquiries from the microprocessor 40 (i.e. BIOS is executed out of RAM).

The real-time clock 98 is used for time of day calculations and the NVRAM 96 is used to store system configuration data. That is, the NVRAM 96 will contain values which describe the present configuration of the system. For example, NVRAM 96 contains information describing the capacity of a fixed disk or diskette, the type of display, the amount of memory, time, date, etc. Furthermore, these data are stored in NVRAM whenever a special configuration program, such as SET Configuration, is executed. The purpose of the SET Configuration program is to store values characterizing the configuration of the system to NVRAM.

Nearly all of the above devices comprise volatile registers. To prevent the unnecessary cluttering of the drawings, the registers of a particular device will be referenced to that device. For example, the CPU registers will be referred to as the CPU 40 registers and the video controller registers will be referenced as the video controller 56 registers.

Figure 4:
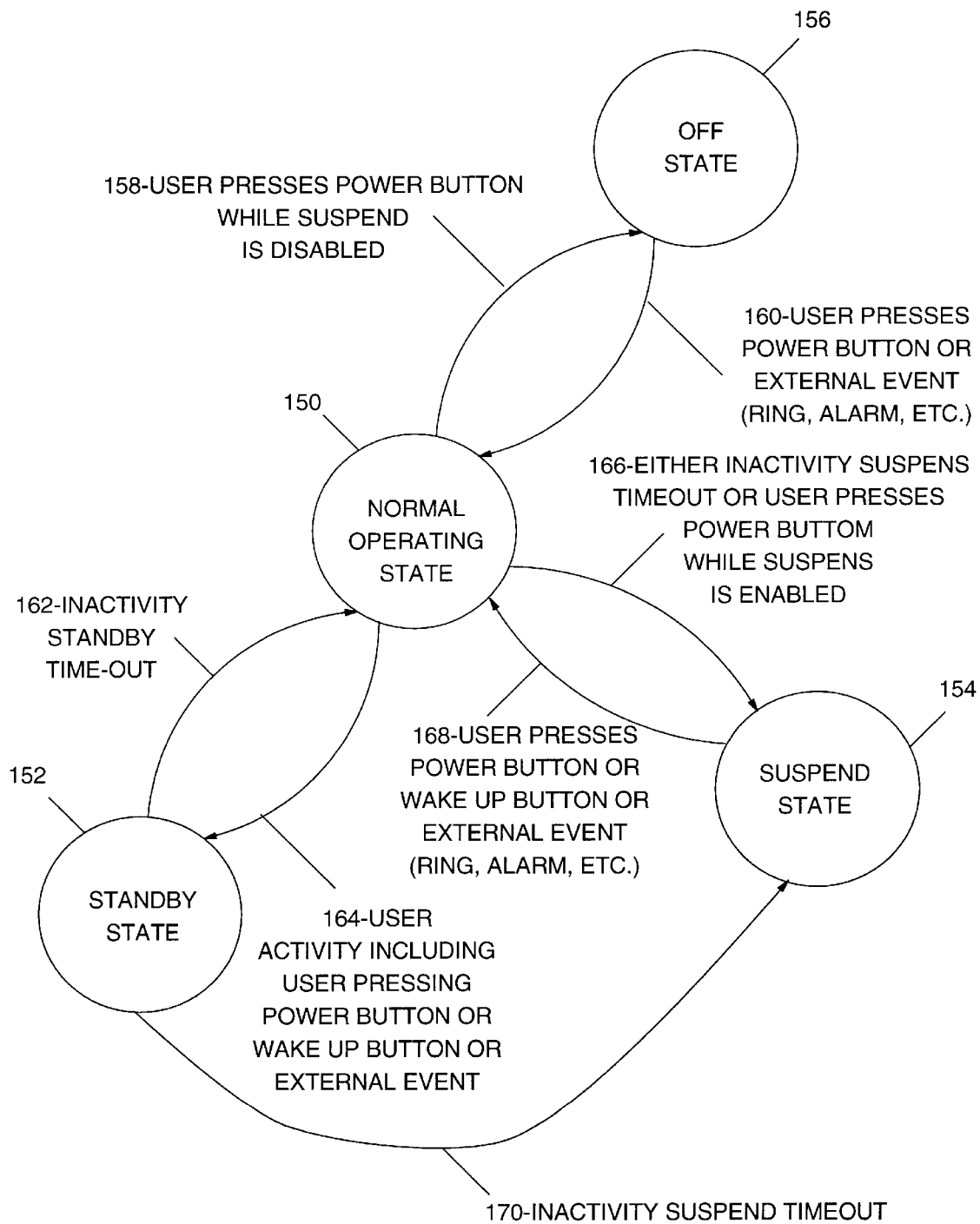
FIG. 4 is a state diagram of the computer system of FIG. 1, showing the four system states: normal, standby, suspend, and off.

Referring now to FIG. 4, a state diagram of the computer system of the present invention is shown. The computer system 10 of the present invention has four states: a normal operating state 150, a standby state 152, a suspend state 154, and an off state 156. The transitions between the states shown in FIG. 4 are meant to be descriptive but not limiting.

Consequently, additional events may alternatively be used to cause state transitions.

The normal operating state 150 of the system 10 is virtually identical to the normal operating state of any typical desktop computer. Users may use applications and basically treat the computer as any other. One difference, transparent to the user, is the presence of a power management driver in the operating system (the "APM OS driver"), which runs in the background (in the BIOS and the operating system), and various APM BIOS routines. The portion of the power management driver in the operating system (OS) is the Advanced Power Management (APM) advanced programming interface written by Intel and Microsoft, which is now present in most operating systems written to operate on Intel's 80X386 or higher family of processors. The portion of the power management driver in BIOS (APM BIOS) communicates with the APM OS driver.

The APM BIOS routines relevant to the present invention are discussed in the text below and include the Boot-Up Routine. Other APM BIOS routines such as the Resume Routine, the Suspend Routine, the Supervisor Routine, the Save CPU State Routine, the Restore CPU State Routine and the APM BIOS Routing Routine are described more fully in the above-mentioned related applications which are hereby incorporated herein by reference. The power management driver in the OS and the APM BIOS routines control the computer's transition between the four states. A reference to the word "APM" by itself generally is a reference to the APM OS driver, although the context may dictate otherwise.

The second state, the standby state 152, uses less electrical power than the normal operating state 150, yet leaves any applications executing as they would otherwise execute. In general power is saved in the standby state 152 by the code placing devices into respective low power modes. Electrical power can be conserved in the standby state 152 by ceasing the revolutions of the fixed disk (not shown) within the fixed disk storage device 31, by ceasing generating the video signal, and by putting the CPU 40 in a low power mode, as will be more fully explained below. However, this is not intended to be limiting and other methods may be used to reduce power consumption, such as slowing or stopping the CPU clock or allowing other peripherals (modem, LAN cards) to enter a low power state.

For example, electrical power can be conserved in three separate ways. First, in the normal operating state 150, the fixed disk within the fixed disk storage device 31 is constantly spinning at, eg., 3600, 4500, or 5400 revolutions per minute (RPM). In the standby state 152, the IDE disk controller 86 is given the command to cause the fixed disk storage device 31 to enter a low-power mode (the fixed disk inside the fixed disk storage device 31 ceases spinning), thereby conserving the power the motor (not shown) inside the fixed disk storage device 31 typically consumes while spinning the fixed disk.

Second, in the normal operating state 150, the video controller 56 of the computer system constantly generates a video signal (HSYNC, VSYNC, R, G, B, etc. as is well known in the art) corresponding to the image seen on the video display terminal 11. In the standby state 152 the video controller 56 ceases generating the video signal, thereby conserving the electrical power normally consumed by the video controller 56; HSYNC, VSYNC, R, G, and B are all driven to approximately 0.00 VDC. Using a VESA (Video Electronics Standards Association) compliant monitor allows further power savings because VESA compliant monitors turn themselves off when HSYNC and VSYNC are at approximately 0.00 VDC.

Note that some systems have "screen-savers," which cause the screen 11 to become dark to prevent phosphor burn-in of the front surface of the video display terminal. In most of such systems, the video controller 56 is still generating a video signal; it is merely generating a video signal corresponding to a dark screen or a dynamic display. Thus, a computer system executing a screen-saver still consumes the electrical power necessary to generate the video signal.

Third, in the normal operating state 150, the CPU 40 constantly executes commands, thereby consuming electrical power. In the standby state 152 the BIOS issues a HALT instruction in response to the APM CPU Idle Call. Executing a HALT instruction significantly reduces CPU power consumption until the next hardware interrupt occurs. When truly idle, the CPU can remain halted more than 90% of the time.

The third state is the suspend state 154. In the suspend state 154, computer system consumes an extremely small amount of electrical power. The suspended computer consumes less than 100 milliwatts of electrical power. The only power consumed is the small amount of power generated at an auxiliary power line by the power supply (when the system is receiving AC power) to monitor power on events.

This small use of electrical power is accomplished by saving the state of the computer system to the fixed disk storage device (the hard drive) 31 prior to turning the power supply "off." To enter the suspend state 154, the CPU 40 interrupts any executing code (e.g., applications) and transfers program execution control of the CPU to the BIOS in the power management driver. The power management driver ascertains the state of the computer system 10 and writes the entire state of the computer system to the fixed disk storage device 31. The state of the CPU 40 registers, the CPU cache 41, the system RAM 53, the system cache 60, the video controller 56 registers, the video memory 56, and the remaining volatile registers are all written to the fixed disk drive 31. The entire state of the system 10 is saved in such a way that it can be restored without significant usability penalties. That is, the user need not wait for the system to load the operating system, and load the graphical user interface, and application programs as it normally would.

The computer then writes data to the non-volatile CMOS memory 96 indicating that the system was suspended. Lastly, the CPU 40 commands the microcontroller U2 to cause the power supply 17 to stop providing regulated power to the system through the ±5 VDC and ±12 VDC lines. The computer system 10 is now powered down with the entire state of the computer safely saved to the fixed disk storage device 31. System power is now "off," and the computer is now only receiving a small amount of regulated power from the power supply (ALIX5) to power the circuitry that monitors the switch.

The fourth and final state is the off state 156. The off state 156 is virtually identical to any typical computer system that has been turned off in the usual manner (press on/off switch). In this state, the primary/regulation unit 172 of the power supply 17 ceases providing regulated power to the computer system 10, (with the exception of a small amount of regulated power through AUX5, as will be more fully explained in the text accompanying FIG. 5) but the state of the computer system 10 has not been saved to the fixed disk 31. The suspend state 154 and the off state 156 are similar in that the power supply 17 no longer ,generates regulated power. They differ in that in the off state 156, the state of the computer system 10 is not saved to the hard drive 31, as it is in the suspend state 154. Moreover, when leaving the off state 156, the computer 10 "boots" as if it is being turned on. That is, any executing code must be started either by the user or automatically by a means such as the AUTOEXEC.BAT file. However, when leaving the suspend state 154, the computer 10 resumes executing where it was when it was interrupted.

FIG. 4 also shows a general overview of the events that cause transitions between the four states. These events will be further explained in the text accompanying FIGS. 6 and 7; however, a cursory explanation may be helpful. The power button 21, extension device wake up button 206 (described in more detail below) three timers (an inactivity standby timer, an inactivity suspend timer and a minutes to wake timer) and a Suspend Enable Flag (see FIGS. 6 and 7 and accompanying text) all affect which state the computer enters. In general, the first two timers can be either hardware or CPU code timers, executing on the CPU as a program. They are both preferably CPU code timers, executing from the BIOS data segments. The timers are more fully explained in the above-mentioned applications.

The Suspend Enable Flag is a CPU-manipulable and readable latch within the NVRAM 96 which will be more fully explained in the text accompanying FIG. 6. In short, putting this bit in one mode causes a press of the switch 21 to place the system 10 into the off state 156 and putting this bit into another mode causes a press of the switch 21 to place the system 10 into the suspend state 154. If the system 10 is in the normal operating state 150 and the power button 21 is pressed while the Suspend Enable Flag is CLEARed, then the system 110 enters the off state 156, as shown at 158. If the system 10 is in the off state 156 and the power button 21 is pressed, then the system 10 enters the normal operating state 150, as shown at 160. In addition, several "external events," which are explained more fully below, can cause the system to transition from the off state 156 to the normal operating state 150.

If the computer system 10 is in the normal operating state 150, one event can cause the computer to enter the standby state 152: if the inactivity standby timer expires, the computer system 10 will change to the standby state 152, as shown at 162. In the alternative, the system can provide a means, such as a dialog box, a switch, or other input device, for the user to force the system into the standby state immediately. While in the standby state 152, any system or user activity (including an external event such as a phone ring) of the kind previously described, including the user pressing the power button 21 (or the wake up button 206), will cause the computer 10 to leave the standby state 152 and re-enter the normal operating state 150, as shown at 164.

Pressing the power button 21 causes the system to change from the standby state 152 to the normal operating state 150 to prevent user confusion. Even if idle, the CPU 40 will soon test whether the switch was pressed. Hardware interrupts remove the CPU 40 from the idle state approximately 20 times per second; thereafter during the next APM Get Event, the microcontroller U2 is queried to determine whether the switch 21 was pressed.

If the computer 10 is in the normal operating state 150, two events can cause it to enter the suspend state 154. First, if the inactivity suspend timer expires, the computer system 10 will change to the suspend state 154, as shown at 166. Second, the user can cause the computer 10 to enter the suspend state 154 immediately by pressing the power button 21 while the Suspend Enable Flag written to NVRAM 96 is SET, also shown at 166. In the alternative, additionally, the APM driver can issue a suspend request via a "Set Power State: Suspend" command, which causes the APM BIOS driver to call the Suspend Routine. While in the suspend state 154, the user changes to the normal operating state 150 by pressing the power button 21 or the wake up button 206, as shown at 168.

In addition, several external events can be used to change the system 10 from the suspend state 154 to the normal operating state 150, at 168, or from the off state 156 to the normal operating state 150, at 160. For example, a telephone ring detect circuit in the microcontroller U2 in the circuitry of FIG. 6 is configured to cause the system 10 to leave the off state 156 or the suspend state 154 and enter the normal operating state 150 when an attached telephone line rings. Such a feature is useful for a system having an answering machine extension unit 200 (FIG. 8) and telephony software, receiving telefax data or digital data. The system enters the normal operating state responsive to the telephone ring, performs the preset functions, such as accepting an incoming phone call and recording a message, accepting an incoming facsimile transmission, uploading or downloading files, allowing remote access to the system, etc., and enters the suspend mode again responsive to the expiration of the Inactivity Suspend Timer, only consuming power while the system is in the normal operating state.

Likewise the microcontroller U2 implements a minutes to wake alarm counter, which allows an alarm-type event to cause the system 10 to leave the suspend state 154 or the off state 156 and enter the normal operating state 150. Such a system is useful in sending telefax or digital data at a certain time of day to take advantage of lower telephone usage rates, and performing system maintenance functions, such as backing up the system hard drive 31 with a tape backup system. In the latter case, the minutes to wake alarm is set to turn the machine on a fixed period of time before the scheduler causes the tape backup program to be executed. In the alternative, the APM BIOS scheduler can be used to cause the execution of the tape backup program.

Lastly, if the system 10 is in the standby state 152 and the inactivity suspend timer expires, then the computer 10 changes to the suspend state 154 as shown at 170. The system 10 cannot change back from the suspend state 154 to the standby state 152, but may only transition to the normal operating state 150 as described in the text accompanying transition 168.

Obviously, the computer system 10 cannot instantaneously change states. In each transition from one of the four states, a certain period of time will be required to make the necessary system changes. The details of each transition relevant to the present invention will be explained in the text accompanying FIGS. 6 and 7.

Figure 5:
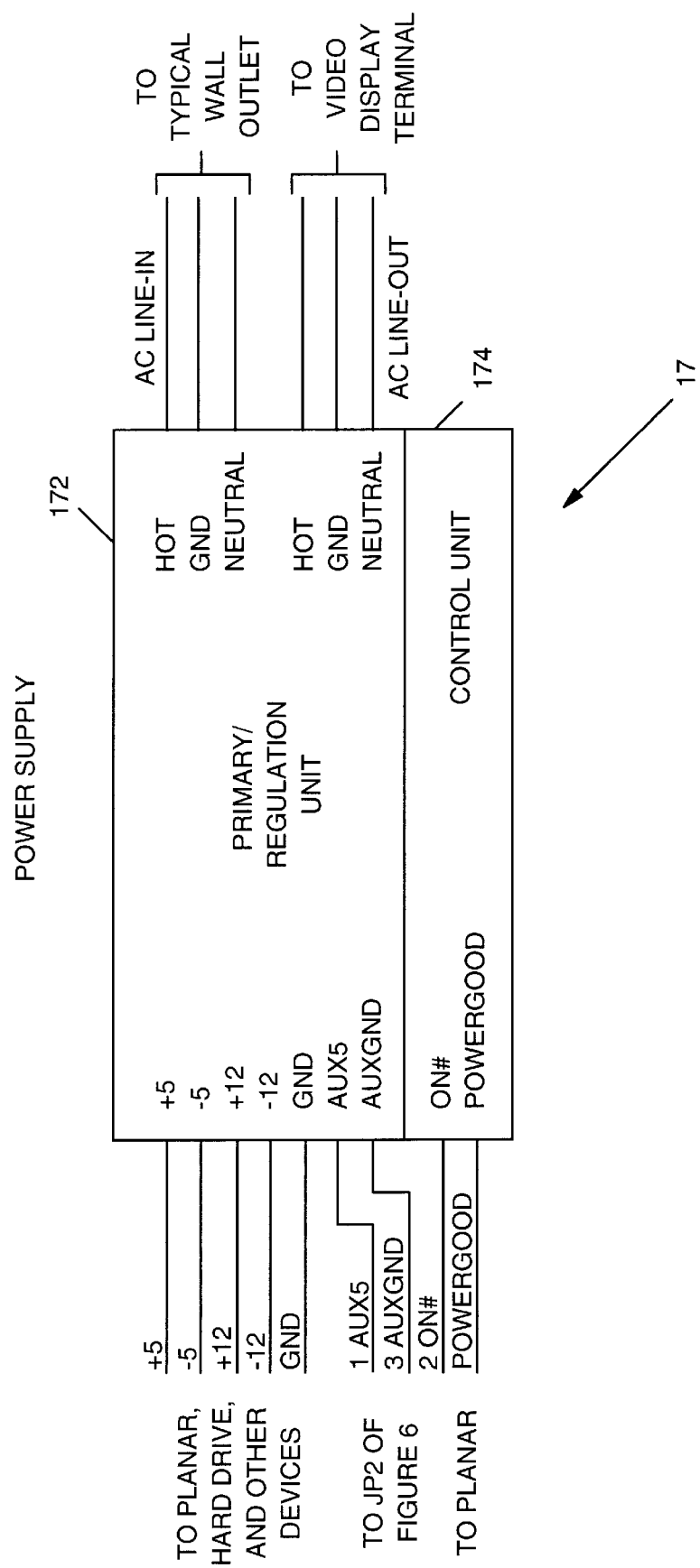
FIG. 5 is a block diagram showing the relevant portions of the power supply of FIG. 3.

Before discussing the details of the code executing on the CPU 40, it may be helpful first to discuss the hardware required to achieve the four states. A block diagram of the power supply 17 is shown in FIG. 5. The power supply 17 has two units: a control unit 174 and a primary/regulation unit 172. The power supply 17 has several inputs: AC Line-In, which accepts either 115 VAC or 220 VAC from a typical wall outlet, and ON#, which controls the regulation activity of the power supply 17. The power supply 17 has several outputs: AC Line-Out, ±5 VDC, ±12 VDC, AUX5, GND, and POWERGOOD. The AC Line-Out is 115 VAC that is typically passed to the electrical power input (not shown) of the video display terminal 11. The control unit 174 accepts the ON# input and generates the POWERGOOD output. The primary/regulation unit 172 selectively regulates the 115 VAC from the AC Line-In input down to ±5 VDC and ±12 VDC. Whether the primary/regulation unit 172 regulates power at the ±5 VDC and ±12 VDC lines depends on the value of ON# as interfaced by the control unit 174. It is preferred that the control unit 174 provide isolation for the circuitry generating the ON# signal using, for example, an appropriate optoisolator.

The AC Line-In input and the AC Line-Out, ±5 VDC, ±12 VDC, GND, and POWERGOOD outputs are well known in the art. When the power supply 17 is "off," that is, not providing regulated voltages from the Line-In, the POWERGOOD signal is a logical ZERO. When the power supply 17 is "on," the power supply 17 generates the ±5 VDC and ±12 VDC regulated voltages from the 115 VAC or 220 VAC Line-In. These four regulated voltages and their associated GND are the "system power" as is commonly known in the art. When the regulated voltages attain levels within acceptable tolerances, the POWERGOOD signal changes to a logical ONE. Whenever either the +5 or +12 Volt lines fall out of tolerance, the POWERGOOD signal becomes a logical ZERO, thereby indicating this condition.

The AUX5 output provides an auxiliary +5 VDC to the planar. When the power supply 17 is plugged into a typical wall outlet supplying a nominal 115 VAC, the primary/regulation unit 172 provides regulated +5 VDC at AUX5, whether the power supply is "on" or "off." Thus, while receiving AC power, the power supply 17 is always providing a nominal +5 VDC at AUX5. The AUX5 output differs from the +5 output in that the primary/regulation unit 172 only generates regulated +5 VDC through the +5 output while the power supply 17 is "on." The AUX5 output further differs from the +5 output in that the primary/regulation unit 172 supplies several amps of current at +5 VDC through the +5 output, while the primary/regulation unit 172 supplies less than an amp at +5 VDC though the AUX5 output.

Typical prior power supplies use a high-amperage double-throw switch to connect and disconnect the Line-In input to and from the regulation section of the power supply. The power supply 17 does not use a high-amperage double-throw switch. Rather, the switch 21 controls circuitry that generates the ON# signal. The switch 21 is preferably a momentary single pole, single throw push-button switch; however, those skilled in the art could adapt the circuitry of FIG. 6 to make use of other types of switches such as a single-pole, double throw switch. The AC Line-In is always connected to the primary/regulation unit 172 from the wall outlet. When ON# is a logical ONE (approximately AUX5, nominally +5 VDC), the primary/regulation unit 172 does not regulate the 115 VAC Line-In to ±5 VDC or ±12 VDC through the ±5 or ±12 outputs. The primary/regulation unit 172 merely provides a low-amperage nominal ±5 VDC at the AUX5 output. On the other hand, when ON# is a logical ZERO (approximately GND), the primary/regulation unit 172 does regulate the 115 VAC Line-In to ±5 VDC and ±12 VDC through the four ±5 and ±12 outputs, respectively. Thus, when ON# is a ONE, the power supply 17 is "off" and when ON# is a ZERO, the power supply 17 is "on."

If specified, power supplies having an AUX5 output and an ON# input, like the power supply 17 described above, can be obtained from suppliers of more conventional power supplies.

Referring now to FIG. 6, a schematic drawing of the electronic circuitry of the computer system 10 of the present invention is shown. The circuitry in FIG. 6 is responsible for interfacing between the switch 21, the power/feedback LED 23, the power supply 17, the video display terminal 11, and code executing on the CPU 40.

The circuitry comprises four (4) integrated circuits—U1, a first preprogrammed PALL16LV8; U2, a preprogrammed 87C750 microcontroller; U3, a 74LS05, which is well known in the art; and U4, a second preprogrammed PAL16L8 (not shown)—and the various discrete components in circuit communication as shown in FIG. 6. In general, the PALs U1 and U4 (not shown) interface between the planar I/O bus 90 of FIGS. 3A and 3B and the microcontroller U2, which interfaces to the remaining circuitry of FIG. 6, which interfaces to the switch 21, the power supply 17, the video display terminal 11, and a programmable clock synthesizer (not shown).

The circuitry of FIG. 6 further comprises the switch 21, a 16 MHz crystal Y1, sixteen resistors R1–R16, nine capacitors C1–C9, three N-type MOSFETs Q1–Q3, which are standard low-current NMOS FETs suitable for acting as a logic switch in the preferred embodiment, and six (6) 1N4148 small signal diodes CR1–CR6, all configured and connected as shown in FIG. 6. The resistors R1–R16 are ¼ Watt resistors and are of values shown in FIG. 6, ±5%. The capacitor C1 is a 10 $\mu$F (±10%) electrolytic capacitor. The capacitors C2 & C3 are 22 pF (±10%) tantalum capacitors. The capacitors C4–C8 are 0.1 $\mu$F (±10%) ceramic capacitors. Finally, the capacitor C9 is a 1000 pF (±10%) ceramic capacitor.

The crystal Y1 and the capacitors C2 and C3 generate signals used by the microcontroller U2 to control the timing of operations, as is known in the art. The diodes CR1 and CR3 and the resistor R13 isolate the AUX5 signal from the VBAT signal, while at the same time allowing the AUX5 signal to supplement the VBAT signal in that while the power supply 17 generates the AUX5 signal, the battery 171 is not drained. Rather, the AUX5 signal is stepped down through the diodes CR1 and CR3 to supply the proper voltage to the devices connected to VBAT. In the alternative, the VBAT line is isolated from the AUX5 line.

The second PAL U4 (not shown) is connected to address lines SA(1) through SA(15) and the AEN (address enable) line. SA(1) through SA(15) and AEN are part of the planar I/O bus 90 shown in FIGS. 3A and 3B. The second PAL U4 is programmed to be merely an address decoder, presenting an active low signal DCD# when a predetermined address is presented on address lines SA(1) through SA(15) and the AEN (address enable) line is active. In this particular embodiment, the second PAL U4 is preprogrammed to decode two consecutive 8-bit I/O ports at addresses 0ECH and 0EDH. In the alternative, the DCD# signal can be generated by another electronic device, such as from a memory controller's general purpose input/output port, as is known to those skilled in the art.

The first PAL U1 is programmed to provide several functions: (I) a read/write interface between the CPU and microcontroller U2 to allow commands and data to be transferred between the CPU 40 and the microcontroller U2, (ii) a logical ORing of the mouse interrupt INT12 and the keyboard interrupt INT1; and (iii) a reset output to reset the microcontroller U2 responsive to commands from the CPU 40.

The first PAL U1 makes use of two consecutive I/O ports, also herein referred to as the "power management ports." The first PAL U1 has eight inputs from the planar I/O bus 90: SD(4), SD(0), SA(0), IOW#, IOR#, RST_DRV, IRQ1, and IRQ12. The first PAL U1 is reset to a known initial condition by the active high signal RST_DRV input at pin 7 (16), which is generated by the memory controller 46, as is well known to those skilled in the art.

A reset line RST751 of the microcontroller U2 is at pin 9. A reset subcircuit 920 is responsible for generating the RST751 signal and comprises the four resistors R4, R14, R15, and R16, the two capacitors C1 and C8, and the two MOSFETS Q2 and Q3, in circuit communication with the first PAL U1 and the microcontroller U2 as shown in FIG. 6. The reset subcircuit 920 interfaces the reset output signal RESET from the first PAL U1 to the reset input signal RST751 of the microcontroller U2 such that when the RESET line is at a logical ONE, the RST751 line is pulled to a logical ONE, thereby resetting the microcontroller U2.

The first PAL U1 resets the microcontroller U2 responsive to the CPU 40 writing a logical ONE to bit 0 of control port OEDH. Writing a logical ONE to bit 0 of control port 0EDH causes the first PAL U1 to pull the RESET line to a logical ONE, which pulls the RST751 line to a logical ONE, thereby resetting the microcontroller U2. The CPU 40 clears the reset request by writing a logical ZERO to bit 0 of control port OEDH.

In addition, the reset subcircuit pulls the RST751 line to a logical ONE, thereby resetting the microcontroller U2, whenever the voltage of AUX5 signal raises by a given amount, as would occur after the AUX5 voltage lowers during a "brownout" or "blackout" of the AC source to the power supply 17 occurs. The manufacturer of the 87C750, Philips, suggests using a simple RC circuit to prevent reset problems; however, a simple RC circuit can allow the 87C750 to latch up during power supply brownouts. In the particular configuration of FIG. 6, the RST751 line is pulled to a logical ONE for a period of time determined by R15 and C8 (thereby resetting the microcontroller U2) when the AUX5 voltage raises by a threshold amount in a period of time greater than the time constant determined by R4, R14, and C1. This would occur after a typical brownout or blackout. The threshold value is approximately 1.5 VDC in the embodiment shown in FIG. 6.

The reset circuit provides the benefits of increased reset protection for the microcontroller U2, while being very inexpensive and consuming virtually no power when not resetting the microcontroller U2.

The microcontroller U2 is interfaced to the CPU 40 via the first PAL U1 and has a number of inputs, outputs, and internally controllable functions.

The SWITCH signal is input at pin 8 (P0.0) and reflects the current state of the push-button 21. The push-button 21 is normally open. While the push-button 21 is open, the SWITCH line is pulled to a logical ZERO (ground) through resistor R1. When the push-button 21 is pressed, thereby causing a closure event, the SWITCH line is pulled up to a logical ONE (AUX5) through resistor R12. Capacitor C6 acts to debounce the switch closure event; any further debouncing of closure events of the switch 21 are performed within the microcontroller U2 by reading the SWITCH a predetermined number of times, e.g., 50 times, and assuring that the SWITCH line is the same for all those reads, as is known to those skilled in the art.

The regulation of the power supply 17 is directly controllable by the microcontroller U2. As shown in FIG. 6, the C)N signal is output at pin 5 (P3.0) and is wire-ORed with the SWITCH signal via resistor R6 to control the ON# signal of the power supply. When the ON signal is a logical ONE, MOSFET Q1 conducts, thereby pulling the ON# line (pin 2 of JP2) to a logical ZERO (GND), thereby causing the power supply 17 to begin providing regulated power to the system through the ±5 VDC and ±12 VDC lines. On the other hand, when the ON line is a logical ZERO, MOSFET Q1 does not conduct, therefore the ON# line (pin 2 of JP2) is pulled to a logical ONE (AUX5) by resistor R7, thereby causing the power supply 17 to cease providing regulated power through the ±5 VDC and ±12 VDC lines.

The state of the ON line is controlled by the microcontroller U2 responsive to a closure event of the switch 21 and responsive to the CPU 40 via a writable register bit within the microcontroller U2, which can be written by the CPU 40. The microcontroller U2 is powered by AUX5; therefore, the microcontroller U2 is always powered, executing code, and controlling the system. If the power supply 17 is not providing regulated power to the system through the ±5 VDC and ±12 VDC lines and either (I) the switch 21 is pressed, (ii) one of the external events occurs or (iii) the internal alarm expires, then the microcontroller U2 asserts the ON signal, thereby causing the power supply 17 to provide regulated power to the system through the ±5 VDC and ±12 VDC lines. The microcontroller continues asserting the ON signal after the switch 21 is released.

As a backup system, the power supply 17 can also be turned on under the direct control of the user via the push-button 21. This option will typically only be used if the microcontroller U2 ceases functioning as expected, as will be evidenced by the system not powering up responsive to a press of the power button 21. As shown in FIG. 6, the switch 21 also controls the ON# line of the power supply 17 via the diode CR2, the MOSFET Q1, the resistor R7, and the connector JP2. Normally the pushbutton 21 is open and the SWITCH line is pulled to a logical ZERO through R1 and MOSFET Q1 does not conduct; therefore the ON# line (pin 2 of JP2) is pulled to a logical ONE (AUX5) by resistor R7, and the power supply 17 is not providing regulated power through the ±5 VDC and ±12 VDC lines.

When the switch 21 is pressed and held by the user, the SWITCH line is pulled to a logical ONE and MOSFET Q1 conducts, thereby pulling the ON# line (pin 2 of JP2) to a logical ZERO (GND), thereby causing the power supply 17 to begin providing regulated power through the ±5 VDC and ±12 VDC lines. With the button 21 still held in, after the system is powered, the BIOS causes the CPU 40 to test whether the microcontroller U2 is still functioning. If not, the CPU 40 resets the microcontroller U2, which, after being reset, detects that the switch 21 is being pressed. Consequently, with the button 21 still held, the microcontroller asserts the ON signal and the user can finally release the switch 21 with the knowledge that the microcontroller is now controlling the power supply 17. To use this backup option, the user must press the button 21 for a period of time on the order of seconds—approximately five seconds into POST.

The microcontroller U2 only turns off the system responsive to either (I) the switch 21 being pressed or (ii) the CPU 40 commanding the microcontroller to turn off the system. To the microcontroller U2, these events are the same, because the microcontroller is configured such that a switch press can be caused either by a closure event of the switch 21 or by the CPU 40; a hardware button press/release is treated virtually the same as a software button press/release. The microcontroller U2 only turns off the system without a command by the CPU if the APM connect flag in the microcontroller U2 is cleared. In this case, when the system is powered and the APM connect Flag is CLEARed, responsive to a closure event of the switch 21, the microcontroller U2 clears the ON signal, thereby causing the power supply 17 to cease providing regulated power to the system through the ±5 VDC and ±12 VDC lines. The ON signal remains cleared after the switch 21 is released.

The microcontroller U2 also turns off the system 10 responsive to a command by the CPU, as would be issued after a the system state has been successfully saved to the hard disk drive 31 (suspended). Responsive to such a command, the microcontroller U2 clears the ON signal, thereby causing the power supply 17 to cease providing regulated power to the system through the ±5 VDC and ±12 VDC lines.

The microcontroller U2 can also detect and affect the system when certain external events occur. The EXT_RING signal is input at pin 7 (P0.1) and allows the microcontroller U2 to detect a ring from the powered external modem 83. As known to those skilled in the art, typical external modems supply a ring signal that toggles to a logical ONE in the well known RS-232C format when a ring signal is detected across the tip and ring telephone lines. This signal is interfaced to the microcontroller U2 via diode CR6 and divided with resistors R9 and R10 and finally input into the microcontroller U2 via the EXT_RING line. The toggling signal is sampled every 25 milliseconds and analyzed by the microcontroller U2, which deems that a ring is present whenever this input is a logical ONE for two consecutive samples. Responsive to this condition being met, the microcontroller U2 asserts the ON signal, thereby causing the power supply 17 to being providing regulated power to the system through the ±5 VDC and ±12 VDC lines. For the EXT_RING signal to be used to detect an incoming telephone call, an externally powered modem 83 must be present.

Figure 3A:
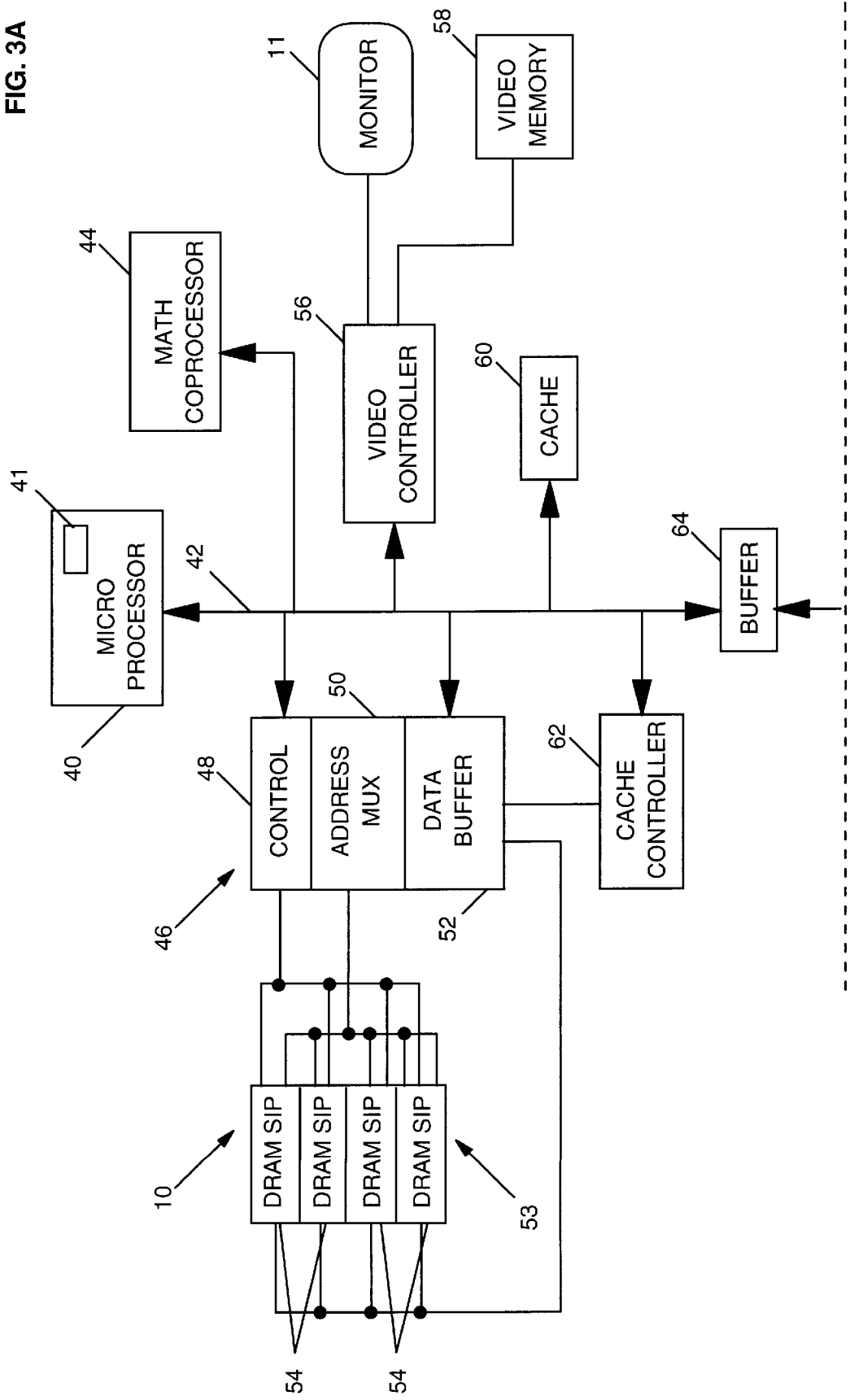
Figure 3B:
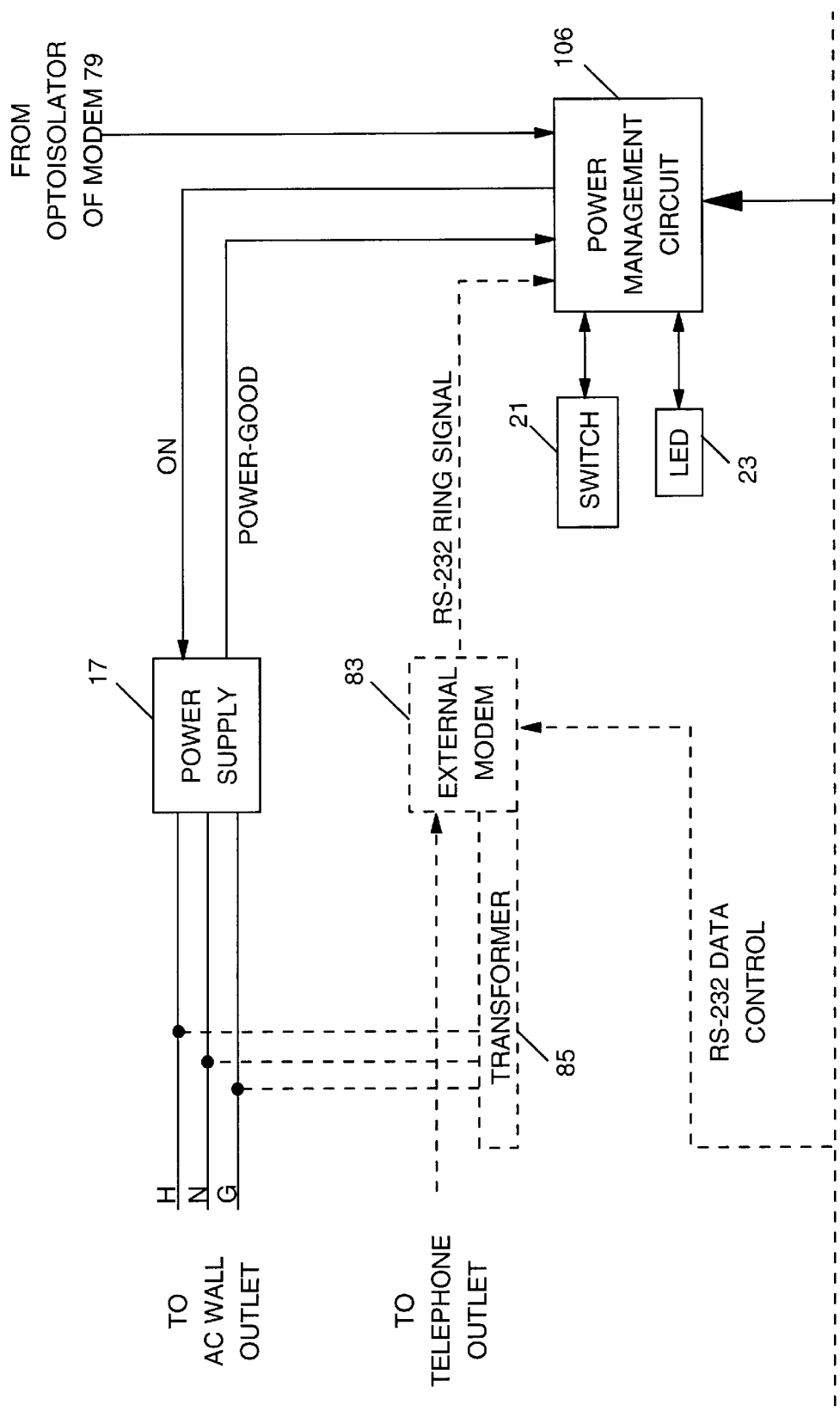
Figure 3D:
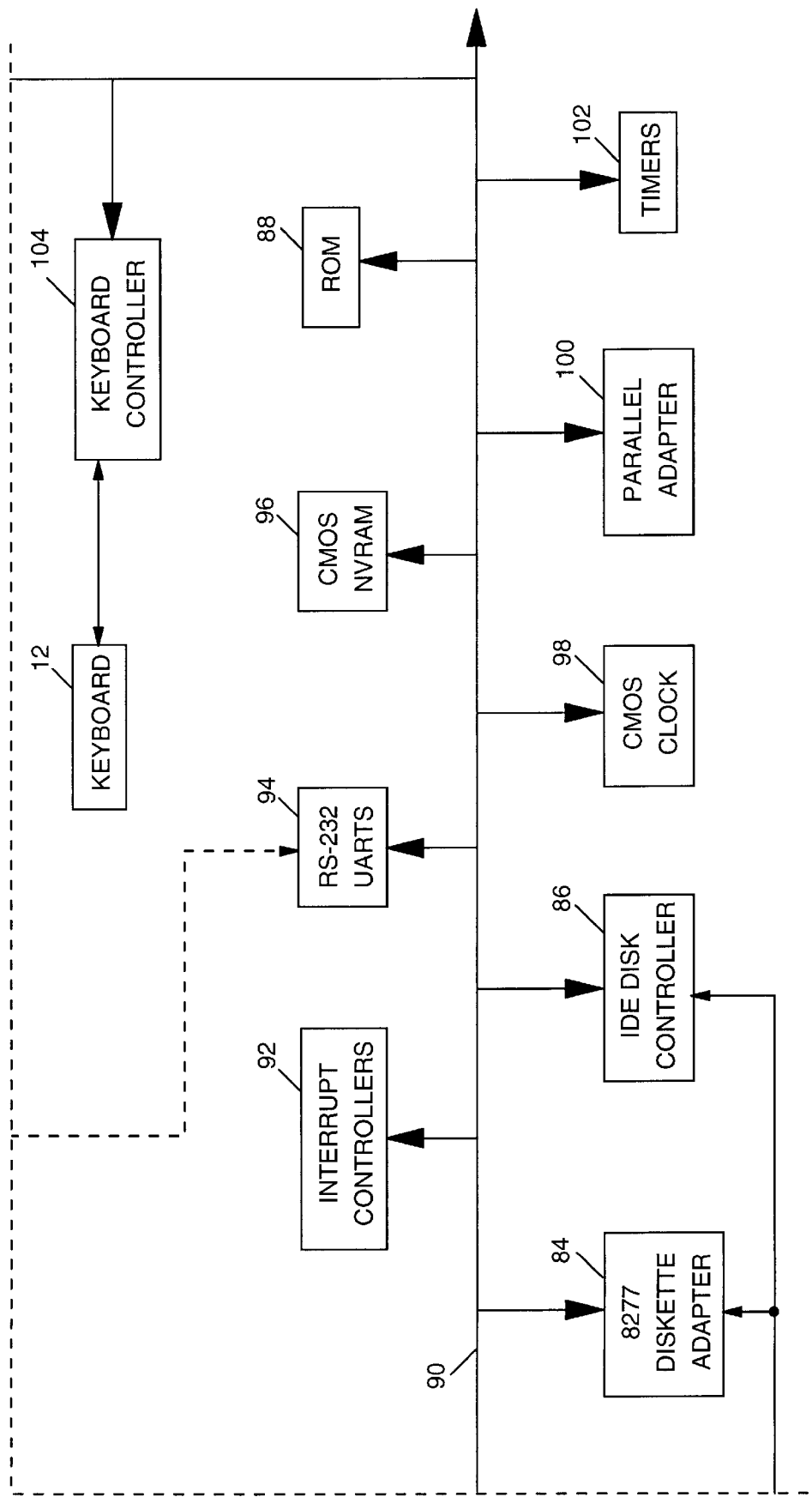

As shown in FIGS. 3B and 6, the present embodiment also has a provision for detecting a telephone ring signal from an internal modem 79 having an optoisolator (not shown) OPTO1 based ring-detect circuit. Many suitable optoisolators are manufactured by e.g., Hewlett Packard, and widely available from numerous sources. The internal modem 79 can either be designed into the circuitry of the system planar 20 or placed into one of the expansion slots 78. In the latter case, the modem 79 must be modified to provide a Berg or similar connector to allow the signal from the optoisolator OPTO1 to be electrically connected to the circuitry of the power management circuitry of FIG. 6. The EXT_WAKEUP# signal is input at pin 6 (P0.2) of the microcontroller U2 and is used to input a signal from the ring-detect optoisolator OPTO1 from the internal modem 79. This signal is interfaced via resistors R8 and R5, diode CR6, and capacitor C9 and finally input into the microcontroller U2 via the EXT_WAKEUP# line.

The toggling signal from the optoisolator OPTO1 is detected and analyzed by the microcontroller U2, which deems that a ring is present whenever three (3) consecutive signal periods of the signal on EXT_WAKEUP have a frequency of between 15.1 Hz and 69.1 Hz. Unlike the EXT_RING signal circuit, which must be powered to provide the ring signal along EXT_RING, the internal modem 79 need not be powered for the optoisolator OPTO1 to supply a suitable signal along the EXT_WAKEUP# line, which is normally pulled up to AUX5 by R5.

In the preferred embodiment, the CPU 40 has a system management interrupt (SMI). The microcontroller U2 can interrupt the CPU 40 via the CPU's SMI. The SMI signal SMI_OUT# is output at pin 3 (P3.2) of the microcontroller U2 and allows the microcontroller U2 to immediately interrupt the CPU 40 without waiting for the operating system to validate or otherwise allow the interrupt. SMI_OUT# may be directly connected to the CPU's SMI# pin or to an external power management interrupt (EPMI#) pin found on memory control chip 46. The signal on the EPMI# pin of the control chip 46 typically passes its state through another pin of the control chip 46 which is connected to the CPU 40 SMI# pin. In the preferred embodiment of the present invention SMI_OUT# is tied directly to the CPU 40.

The state of the SMI_OUT# line is controlled by a writable register bit, which can be written by the CPU 40, located within the microcontroller U2. In addition the microcontroller U2 can assert the SMI_OUT# signal and thereby interrupt the CPU 40 (I) responsive to activity being detected on the ACTIVITY# line or (ii) before the microcontroller U2 causes the power supply 17 to stop providing regulated power to the system. Either or both of these events can be enabled and disabled by commands from the CPU to the microcontroller U2.

Before entering the SMI routine (described below), the microcode in the CPU 40 saves the state of the CPU to the special CPU state save area to or from memory. Thereafter, the CPU 40 executes the SMI interrupt handler, which performs the functions below. To restore the state of the CPU, the SMI interrupt handler issues the RSM (resume) instruction, which causes the CPU 40 to restore its own state from the special save area.

Before the CPU 40 causes the microcontroller U2 to interrupt the CPU 40 via the CPU's SMI, the CPU 40 writes a value to a variable in CMOS NVRAM 96 indicating the reason for the SMI. This value in CMOS NVRAM 96 defaults to 00H, which indicates to the CPU 40 that the microcontroller U2 is interrupting the CPU 40 asynchronously, as occurs before the microcontroller U2 causes the power supply 17 to stop providing regulated power. After each SMI, the CPU 40 sets that variable in CMOS NVRAM to 00H. Responsive to this value, the CPU 40 performs certain tasks under the assumption that the system is going to be powered down imminently by the microcontroller U2. The CPU 40 can extend the period of time before which the microcontroller U2 powers down the system by periodically restarting the power down extend timer within the microcontroller U2. In summary, anytime an SMI occurs when the CPU 40 does not cause the SMI, the value in CMOS NVRAM 96 will be 00H. The SMI handler then determines the appropriate action to be taken based on what event caused the SMI.

During this period of time before the system 10 powers down, the CPU 40 can perform numerous tasks. For example, the CPU writes to the CMOS NVRAM 96 certain information that is to be written to the hard drive 31 later, such as the period of time the computer system was operating since its last power on (as will be more fully described below). In addition, since the user may have changed one or more of the parameters that affect the wake alarm, the CPU recalculates and writes to the microcontroller U2 a fresh minutes to wake value.

Other values written by the CPU 40 include 01H, which indicates that the CPU 40 is to jump to the Suspend Routine; 02H, which indicates that the CPU 40 is to jump to the Resume Routine; and 0FFH, which indicates that the CPU 40 is to set up the special CPU state save area in the segment 000H data structure.

The microcontroller is given control over blanking the display 11. The DISP_BLANK signal is output via pin 1 (P3.4) of the microcontroller U2 and directly controls the blanking of the display 11. Two inverters U3D and U3E interface the DISP_BLANK signal with the ESYNC# and BLANK# lines. With the DISP_BLANK signal at a logical ZERO (GND) the outputs of U3D and U3E are isolated which allows the video controller 56 to generate a video signal. When DISP_BLANK is a logical ONE (Vcc), BLANK# and ESYNC# are at a logical zero (GND) and the video controller 56 ceases generating the video signal. The state of the DISP_BLANK line is controlled by a writable register bit, which can be written by the CPU 40, located within the microcontroller U2. The CPU 40 instructs the microcontroller U2 to blank the display when the system enters the standby state 152. In addition, the DISP_BLANK line is sequentially SET then CLEARed responsive to closure events of the switch 21. Similarly, activity at any one of the activity interrupts, in this case INT1 and INT12, causes the microcontroller to CLEAR the DISP_BLANK line, thereby allowing the video controller 56 to generate the video signal.

CLK_SLOW# is output at pin 2 (P3.3) of the microcontroller U2 and is used to control a clock synthesizer (not shown). The state of the CLK_SLOW# line is controlled by a writable register bit, which can be written by the CPU 40, located within the microcontroller U2. In addition, the CLK_SLOW# line can be cleared by the microcontroller U2 in response to activity at the ACTIVITY# line. It should be understood by those of ordinary skill in the art that various clock synthesizers can be used in the present invention. One such clock synthesizer is the CH9055A, which is manufactured by Chrontel, and widely available from numerous sources.

Additionally, the microcontroller U2 directly controls the illumination of the power/feedback LED 23. The LED_CNTRL signal is output at pin 22 (P3.6) and allows direct control of the power/feedback LED 23 by the microcontroller U2. The resistors R2 and R3 and diodes CR4 and CR5 allow the power/feedback LED 23 to be driven by either the AUX5 power line or the VCC power line in response to the LED_CNTRL line being at a logical ZERO. When the LED_CNTRL line is at a logical ONE, the power/feedback LED 23 is not illuminated. The state of the LED_CNTRL line is controlled by the microcontroller U2 in response to a closure event of the switch 21, in response to the wake alarm, in response to one or more rings at either ring-detect input, or in response to the system 10 being placed in the standby mode.

The microcontroller U2 can control the LED 23 to be a simple power LED. As such, the LED 23 is illuminated after a closure event of the switch 21 that causes the system to change from either the off state 156 or the suspend state 154 to the normal operating state 150. Likewise, the microcontroller U2 extinguishes the LED 23 after a release event of the switch 21 that causes the system to change from the normal operating state 150 to either the suspend state 154 or the off state 156.

In addition, the LED 23 can be selectively flashed at a particular rate, e.g., every second, by the microcontroller U2 to indicate that the system is in the standby state 152. In addition, the LED 23 can be selectively flashed at a different rate, e.g., every half-second, by the microcontroller U2 to indicate that the system was awakened by a ring or by the alarm and the system is in either the off state or the suspend state. In the alternative, while in the suspend state, the LED 23 can be selectively flashed in groups of flashes by the microcontroller U2 to indicate the number of times the system was powered up by external events, such as a ring, alarm, etc., and was powered back down by the expiration of the inactivity suspend timer. In this case, the BIOS is provided with one or more functions to allow the OS and application programs to modify the number of times the microcontroller U2 is to flash the LED 23.

The PWR_GOOD signal is input at pin 4 (P3.1) of the microcontroller U2 and allows this signal to be used by the microcontroller U2 and the CPU 40. Specifically, the microcontroller uses the PWR_GOOD signal to implement a feedback-based fault detection and correction circuit to determine if the power supply 17 has faulted and to clear the faulted condition. If the ON signal has been asserted for a period of time (e.g., three seconds) and the PWR_GOOD signal is at a logical zero, indicating that the power supply 17 is not providing regulated voltages at proper levels, then the microcontroller U2 assumes that the power supply 17 has faulted from, e.g., an overcurrent condition. Consequently, to possibly clear the faulted condition, the microcontroller U2 ceases asserting the ON signal for a period of time (e.g., five seconds) to allow the fault to clear. Thereafter, the microcontroller U2 reasserts the ON signal and waits for the PWR_GOOD signal to become a logical ONE, indicating that the power supply 17 is now providing regulated power to the system. Without this feedback-based fault detection and correction, the power supply 17 would remain faulted and the microcontroller U2 would continue to assert the ON signal in an attempt to cause the power supply 17 to begin generating regulated power. The only solution would be to remove AC power from the power supply to clear the fault.

The ACTIVITY# signal is input at pin 19 (INT1) of the microcontroller U2 and is used by the microcontroller U2 to respond to activity at the keyboard 12 and mouse 14. IRQ1 is the keyboard hardware interrupt signal, which is input at pin 8 (17) of the first PAL U1; pressing a key on the keyboard 12 causes the IRQ1 signal to pulse. IRQ12 is the mouse hardware interrupt signal, which is input at pin 11 (19) of the first PAL U1; moving the mouse 14 or pressing a button on the mouse 14 causes the IRQ12 signal to pulse. The IRQ1 and IRQ12 signals are logically ORed in the first PAL U1 and output as the ACTIVITY# signal. Using the ACTIVITY# signal allows the microcontroller U2 to never miss activity of either the keyboard 12 or the mouse 14. Other activity (DMA access, other IRQs, etc,) sources may be easily added to IRQ1 and IRQ2 by those skilled in the art. "Green" chipsets (i.e., chipsets which are capable of entering a low power state and monitoring activity) such as the one shown in FIG. 6 can monitor activity from a variety of sources (DMAS, IRQs, I/O accesses) and their sensing may be easily integrated with the present invention by those skilled in the art.

While in the standby state, activity on either interrupt causes the microcontroller to restore immediately the video display. Using the interrupts IRQ1 and IRQ12 in this manner gives the user immediate feedback in the form of a restored video display when returning from the standby state 152 to tlhe normal operating state 154. Without it, the user might not receive feedback until possibly seconds later when the APM checks for user activity.

Communications between the CPU 40 and the microcontroller U2 are performed using SD(0), which is input at pin 18 (I/06) of the first PAL U1 and input to the microcontroller U2 via the RWD0 line, which is output at pin 13 (I/03) of the first PAL U1 and input at pin 13 (P1.0) of the microcontroller U2, SD(1), which is input at pin 14 (p1.1) of the microcontroller U2, SD(2), which is input at pin 15 (p1.2) of the microcontroller U2, SD(3), which is input at pin 18 (p1.3) of the microcontroller U2, SD(4), which is input at pin 6 (15) of the first PAL U1, IO_STROBE#, which is input at pin 18 (INT0) of the microcontroller U2, and PROC_RDY, which is output at pin 20 (P1.7) of the microcontroller U2. The first PAL U1 and the microcontroller U2 are configured and programmed to provide (I) four-bit parallel writes from the CPU 40 to the microcontroller U2 along SD(0) via RWD0, SD(1), SD(2), and SD(3), with one address being essentially a one-bit write to reset the microcontroller U2 and the other being a nibble written to the microcontroller U2 that is only valid when data bit SD(4) is HIGH, and (ii) serial (one-bit) reads from the microcontroller U2 by the CPU 40 along SD(0) via RWD0, with one address corresponding to the status bit and the other corresponding to a data bit from the microcontroller U2.

Figure 7:
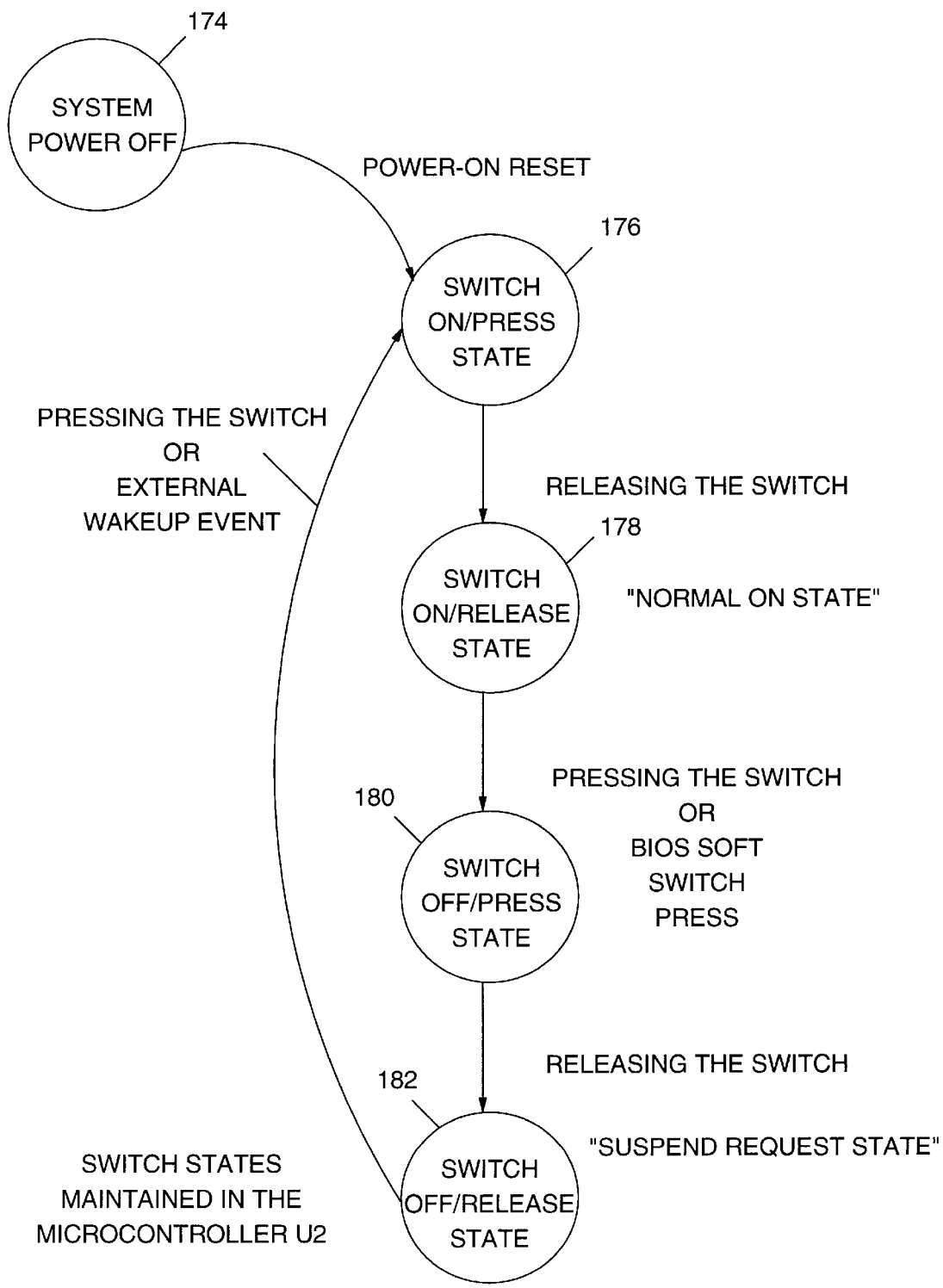
FIG. 7 is a state diagram of one of the switch states maintained by the power management circuitry of FIG. 6.

FIG. 7 shows the switch state machine maintained within the microcontroller U2. As shown therein, the states change in response to closure events of the switch 21 and other events, such as resetting the system 10 and writes by the CPU 40. With AUX5 not being provided by the power supply 17, the microcontroller U2 is not being powered and, therefore, the switch state is meaningless, at 174. Application of AC power causes AUX5 to reset the microcontroller U2 which then enters state 176. A press of switch 21, a telephone ring from either source, the minutes to alarm timer expiring, and a command from the CPU 40 cause the microcontroller U2 to cause the power supply 17 to begin providing system power, as described in the text accompanying FIG. 6.

As shown in FIG. 7, the switch 21 has four states monitored by the microcontroller U2: (I) the on/press state 176 (in which the user is holding in the button and is trying to turn on the machine), (ii) the on/release state 178 (in which the user has released the button and is trying to turn on the machine), (iii) the off/press state 180 (in which the user is holding in the button and is trying to turn off the machine), and (iv) the off/release state 182 (in which the user has released the button and is trying to turn off the machine). Next, at 180, the microcontroller U2 tests whether the switch is in the off/release state, indicating that the user has released the button and is trying to turn off the machine.

When in state 182 and the switch 21 is pressed (or an external wake up event occurs via modem 79, 83 including a press of wake up button 206), the microcontroller U2 enters the on/press switch state 176. Releasing the switch 21 causes the microcontroller U2 to enter the on/release switch state 178. Similarly, when the microcontroller U2 is reset, the microcontroller U2 enters the on/press state 176 and then quickly enters state 178 since the switch is released. Pressing the switch 21 again (or a BIOS soft switch press) causes the microcontroller U2 to enter the off/press switch state 180. Releasing the switch 21 again causes the microcontroller U2 to enter the off/release switch state 182. Subsequent closures of switch 21 causes the microcontroller U2 to cycle through the four states, as shown in FIG. 7.

The microcontroller U2 is in the on/release switch state 178 when the computer system 10 is in the normal operating state 150. Application programs will execute while in that state. The system 10 may enter and leave the standby state 152 in that state. This state also corresponds to a user-generated suspend abort request. The off/release switch state 182 is the switch state corresponding to a suspend request by the user. That is, starting with the system in the off state 156, pressing and releasing the switch 21 once places the system 10 in the normal operating state 150. Pressing and releasing the switch 21 once again generates a suspend request, which is read by the Supervisor Routine. Pressing and releasing the switch 21 a third time, before the system 10 is in the Suspend state 154, generates a suspend abort request, which is read by the Suspend Routine.

For a detailed description of the Boot Up Routine, Supervisor Routine, the APM Working On Last Request Routine, the APM Reject Last Request Routine, the Suspend Routine, the Resume Routine, the Save CPU State Routine, the Restore CPU State Routine, the Save 8959 State Routine, the Dynamic Save File Allocation Routine, the Exit Standby Routine, the Enter Standby Routine and the Power management Processor Routines see the above mentioned related patents and application.

The present invention is directed to an extension device 200 for use with computer system 10. As noted above, the computer system 10 has an answering machine program stored therein. The extension device 200 allows a user to access the answering machine functions of the program without having to physically be near the computer system 10. For example, the computer system 10 could be in one room of the house that is more suitable for a personal computer 10 such as a den or home office while the extension unit 200 can be in a room more suitable for a telephone answering machine such as a kitchen or family room.

As will be described in more detail below, when the system 10 is in the normal operating state 150, the user can use one of the buttons on the unit 200 to control the extension device 200 to operate in accordance with the answering machine functions of the computer's answering machine software. The unit 200 includes a wake up button 206 that allows a user to "wake up" the system 10 (i.e., change the system from the standby state 152 or suspend state 154 to the normal operating state 150). A display is included on extension device 200 for indicating the number of messages that have been recorded including if none were recorded.

Figure 8:
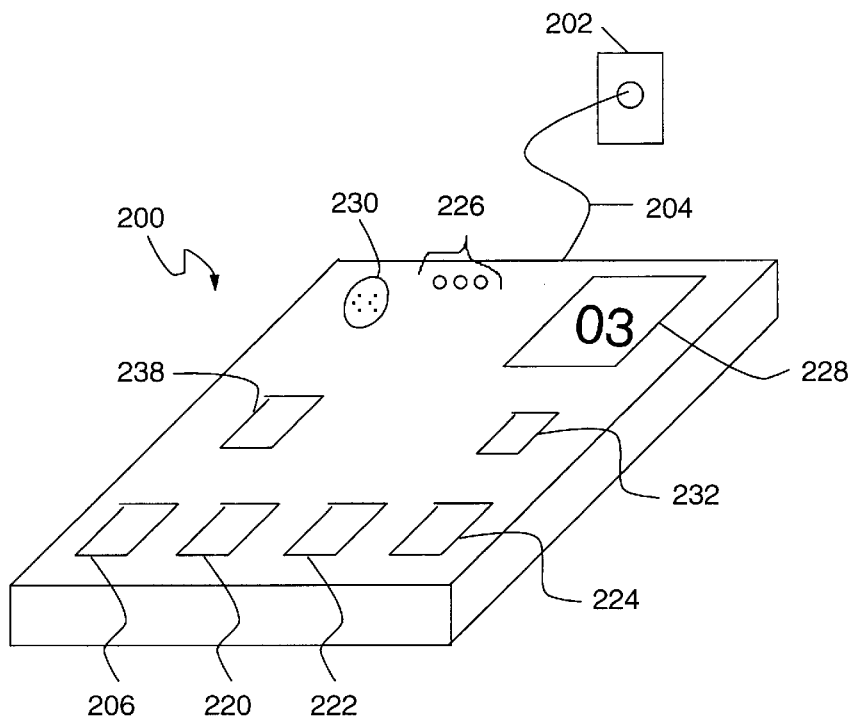
FIG. 8 is a perspective view of the extension device of the present invention.
Figure 9:
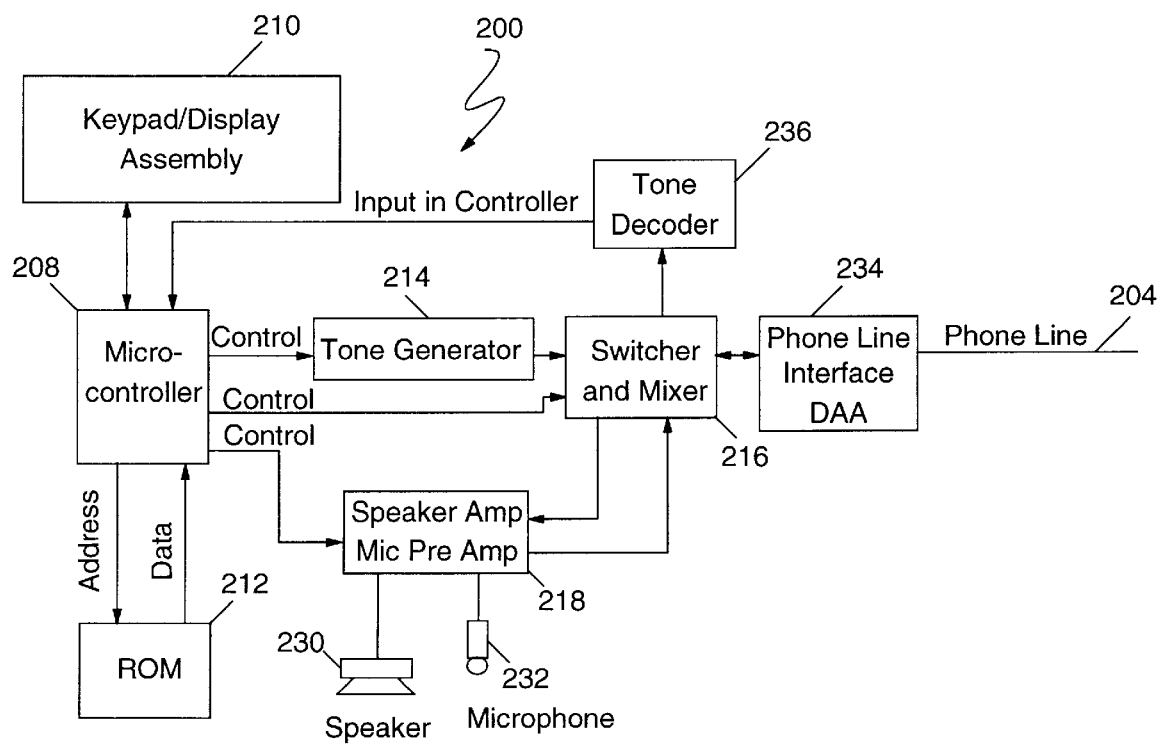
FIG. 9 is a block diagram of the internal components of the extension device of FIG. 8.

Referring now to FIGS. 8 and 9, the extension device 200 includes a microcontroller 208 for controlling each of the internal components of extension device 200. The microcontroller 208 has an internal clock which is used to synchronize and coordinate the transmission of data and control information between the internal components of extension unit 200. The microcontroller 208 is coupled to a read only memory (ROM) 212. The ROM 212 stores control programs for allowing the extension device 200 to function as an automatic telephone answering system. More specifically, ROM 212 includes code and programs which control microcontroller 208 to control each of the elements in unit 200 as described in more detail below. The microcontroller 208 accesses the code in ROM 212 by generating an address thereto. The ROM 212 in turn will supply the data from the addressed location to microcontroller 208 as shown in FIG. 9. The code in ROM 212 is used by the microcontroller 208 to control the internal components to send/receive signals via tones over the phone line and communicate with the telephony software and modem 79 (or 83) in system 10.

The microcontroller 208 is coupled to a keypad/display assembly 210 for bilaterally transferring data, address and control information therebetween. The keypad portion of assembly 210 may have any form and arrangement of input keys (several of which are described in more detail below), depending on the features of the unit 200 and is controlled and scanned by the microcontroller 208. For example, the keypad 210 may have buttons for Message Playback 220, Recording Messages 222, Answer On/Off 224, etc. The keypad 210 also includes the wake up button 206 which when pressed by the user will change the state of computer system 10 from the standby state 152 or suspend state 154 to the normal operating state 150 (described in more detail below).

The display portion of assembly 210 provides status and other information to the user, again depending on the type of display used. For example, three individual LEDs 226 can be used to show Answer Ready, Recording and Messages. The Answer Ready LED is turned on to indicate that the answering machine unit 200 is ready to answer incoming calls in the manner described below. The Recording LED indicates the readiness of the unit 200 for recording an outgoing greeting or memo. The Messages LED shows the number of messages recorded by flashing the LED a corresponding number of times, followed by a long pause. If more than ten messages have been recorded, the Message LED flashes continuously. As an alternative, the display portion can include two seven-segment LED or LCD digits 228 which will show the actual number of messages recorded The extension unit 200 is coupled to a standard phone jack 202 (which may be in the family room) via a typical analog phone line 204. The telephone line 204 from wall outlet 202 is connected to a phone line interface data access arrangement (DAA) 234 which is well known in the art for impedance matching and protecting a phone line from circuitry in extension device 200. Data received by the DAA 234 from phone line 204 is fed to the switcher/mixer 216 which is used to mix the audio signal and switch the audio on/off the phone line 204 (i.e., switcher/mixer 216 provides an audio routing function). A tone decoder 236 senses and decodes control tones received from phone line 204 after they have been amplified and filtered by switcher/mixer 216. The decoder 236 feeds a binary code corresponding to the control tones to the microcontroller 208 (for example, remote control playback). The tone generator 214 is controlled by microcontroller 208 to generate control tones that correspond to the command signals received from the keypad 210.

The microcontroller 208 is also directly coupled to speaker amp/microphone pre-amp circuit 218 for controlling speaker and microphone functions. A speaker 230 is coupled to circuit 218. The speaker 230 is built into the extension unit 200 and is manually controlled by a volume control (not shown) that feeds the speaker audio signal to a speaker amp 218 controlled by microcontroller 208. The circuit 218 is also coupled to microphone 232. The microphone 232 generates a microphone audio signal that passes through a microphone pre-amp circuit 218 for amplification prior to transmission to the phone line 204. The microphone 232 can be used to record an outgoing greeting from the extension device 200.

Power is supplied to unit 200 via a typical AC line power supply (not shown) which connects to a typical AC wall outlet and converts the AC power to DC power for unit 200.

The extension device 200 communicates with the telephony software on system 10 via a sequence of control tones over the phone line 204. The telephony software has been programmed in accordance with the present invention to set up modem 79 (or modem 83) to encode/decode control tones over the phone line. These control tones will correspond to the functions performed by on screen buttons of the software such as Message Playback, Recording Messages, Answer On/Off, etc. The unit 200 on the other hand also encodes/decodes these control tones via the microcontroller 208, tone generator 214 and tone decoder 236 through the mixer 216 and DAA 234.

When a key on keypad 210 is pressed, a command signal is sent to the microcontroller 208. The microcontroller 208 decodes the command signal and controls tone generator 214 to generate encoded control tones which are sent over the phone line 204 to control the corresponding function in the program stored in system 10. More specifically, these control tone signals are received by modem 79 from the phone line 204 and decoded. The modem 79, under control of the telephony program, will then encode the function requested into control tones and send them onto the phone line 204. The latter tones are then received by unit 200 and decoded by the tone decoder 236. The microcontroller 208 receives the decoded control tones and controls the extension unit 200 to operate in accordance with the particular function requested.

For example, when message playback button 220 is pressed, a message playback command is received by the microcontroller 208 which then controls tone generator 214 to send encoded control tone signals through the mixer 216 and DAA 234 onto the phone line 204. These tone signals are decoded and the telephony software then responds by sending control tone signals to extension unit 200 via phone line 204. These control tones inform the unit 200 that an audio message is going to be sent and the microcontroller 208 prepares the necessary components within unit 200 (e.g., the switcher/mixer 216 and speaker amp circuit 218) to process the incoming message.

Next, the telephony software and modem 79 send modulated (i.e., encoded) audio signals of the recorded message back to extension device 200 via phone line 204. This is done by the software playing back the digitized messages stored on the hard drive 31, and the sound card 81 and modem 79 converting the digitized audio signals to modulated signals which are sent over the phone line 204. These modulated signals are demodulated (i.e., decoded) by the microcontroller 208 and tone decoder 236 and turned back into audio signals which are transmitted through amplifier 218 and out to the speaker 230. Any type of well known method for modulating/demodulating audio signals can be used. The use of encoded audio signals is particularly useful when a user is concerned with security (i.e., the user does not want another person to pick up a phone within the house and be able to listen to the message).

Alternatively, the sound card 81 and irnodem 79 could convert the digitized audio message to analog audio signals which are sent directly over the phone line 204. The analog audio signals would be received by the unit 200 and transmitted through the amplifier and out to speaker 230. This analog audio method can be used when security concerns are not an issue.

As another example, when the wake up button 206 is pressed, the microcontroller 208 controls the tone generator 214 to send an encoded control tone signal through the mixer 216 and DAA 234 onto the phone line 204. The modem 79 (or 83) is constantly monitoring the phone line for such a tone, and it is received by the optoisolator of modem 79. The modem 79 will then activate EXT_WAKEUP# line on pin 6 of the microcontroller U2 and the system 10 will change from the suspend state 154 or standby state 152 to the normal operating state 150, as described above.

In operation, if the system 10 is in the normal operating state 150 (for example, the user is working with word processing software on system 10) and a phone call is made by a caller to the user's phone number, the modem 79 (or 83) will detect the ring from the incoming call as described above. The user may answer the phone call by either picking up a phone somewhere near the user or if the user is near the extension unit 200 press the speaker phone button 238 to answer the call. Alternatively, the user may choose to let the phone ring until the answering machine type software on the system 10 responds (typically 2–4 rings as set by the user) with a pre-recorded greeting by the user which was retrieved from RAM 53. After hearing the pre-recorded greeting, the caller may leave a message for the user. The sound card 81 will digitize the message as it is received by the modem 79 and it will be stored (recorded) on the hard drive 31. After the message is recorded the telephony software will control modem 79 to send encoded control tones over phone line 204 to indicate that one message was recorded. These tones are decoded by extension unit 200 and it will indicate that there is one message (e.g., as described above, by either a blinking LED or a numeric LED or LCD). These steps can be repeated for each phone call and the extension unit display will be updated each time to indicate the number of recorded messages.

Next, after the user finishes working with computer system 10 it may be left in the normal operating state 150, or placed into the standby state 152 or suspend state 154 (either directly by pressing the power button with the suspend flag disabled/enabled respectively, as described above, or by expiration of the standby or suspend timer). If the system 10 was left in the normal operating state, then at any time after the message was recorded, the user can use the control buttons on the extension device 200 to control the answering machine functions of the telephony software on system 10. For example, the user can press the "Play Messages" button 220 on the extension device 200 which will signal the system telephony software to playback the recorded message(s).

On the other hand, if the system 10 was placed in the standby or suspend state after the message was recorded, the extension device 200 will still indicate that there is one or more messages. At any time thereafter the user may press the "Wake up" button 206 on the extension device 200 which will send a control tone signal from the tone generator 214 through mixer 216 and DAA 234 to the optoisolator of modem 79 via the phone line 204 as described above. Upon receiving this control tone signal, the system 10 will change from the standby state 152 or suspend state 154 to the normal operating state 150 at which time the user can use the control buttons on the extension device 200 to control the answering machine functions of the telephony software on system 10.

If the system was in the suspend state 154 when the phone call was made by the caller, then upon detecting the ring from the incoming call, the computer system 10 will resume from the suspend state 154 to the normal operating state as described above. Once in the normal operating state 150, the answering machine type software on the system 10 responds to the caller with a pre-recorded greeting by the user. The caller may then leave a message. The software will record the message and after it is recorded the extension device 200 will indicate that there is one message (e.g., as described above, by either a blinking LED or a numeric LED or LCD). Next, after the suspend timer as set by the user (described above) has elapsed, the system will then return from the normal operating state 150 to the suspend state 154. The above steps would be repeated each time the phone rings such that there can be a plurality of recorded messages which will be indicated by the LED or LCD as described above.

Next, at any time thereafter (e.g., whenever the user returns home, etc.) the user will see the number of messages recorded and the user may press the "wake up" button 206 on the extension device 200 which will send a signal from the tone generator 214 through mixer 216 and DAA 234 to the optoisolator of modem 79 via the phone line 204. Upon receiving this signal, the system 10 will change from the suspend state 154 to the normal operating state 150 at which time the user can use control buttons on the extension unit 200 to control the answering machine functions of software on the system 10. For example, the user can press the "Play Messages" button 220 on the extension unit 200 which will signal the system telephony software to playback the recorded message(s).

If the system was in the standby state 152 when the phone call was made by the caller, then upon detecting the ring from the incoming call, the computer system 10 will change from the standby state 152 to the normal operating state 150 as described above. Once in the normal operating state 150, the answering machine type software on the system 10 responds to the caller with a pre-recorded greeting by the user. The caller may then leave a message. The software will record the message and after it is recorded the extension unit 200 will indicate that there is one message (e.g., as described above, by either a blinking LED or a numeric LED or LCD). Next, after the standby timer as set by the user (described above) has elapsed, the system will then return from the normal operating state 150 to the standby state 152. The above steps would be repeated each time the phone rings such that there can be a plurality of recorded messages which will be indicated by the LED or LCD as described above. Of course, it should be noted that if the user has also set the suspend timer, and set it with a longer delay time than the standby timer, then after the longer time has elapsed the system will enter the suspend state and the system will proceed as described above.

Next, at any time thereafter (e.g., whenever the user returns home, etc.) the user will see the number of messages recorded and the user may press the "Wake up" button 206 on the extension device 200 which will send a signal from the tone generator 214 to the optoisolator of modem 79 via the phone line 204 as described above. Upon receiving this signal, the system 10 will change from the standby state 152 or suspend state 154 to the normal operating state 150 at which time the user can use control buttons on the extension device 200 to control the answering machine functions of software on the system 10. For example, the user can press the "Play Messages" button 220 on the extension device 200 which will signal the system telephony software to playback the recorded message(s).

The extension device 200 of the present invention provides an advantage in that it allows a user to use and access the computer system's answering machine software without having to physically be near the computer system 10 in the house. The present invention thus makes the answering machine software functions much more accessible than conventional computer systems.

While the invention has been particularly shown and described with respect to preferred embodiments thereof, it should be understood by those skilled in the art that the foregoing and other changes in form and detail may be made therein without departing from the spirit and scope of the invention as defined in the appended claims. For example, the extension device 200 can be used to play any audio signals that are transmitted from the computer system 10. For example, if the system 10 included software which converts text to audio, then the audio could be played on the extension device 200. This has particular application for remote E-mail where the system 10 can convert text (e.g., an E-mail message) to audio speech, digitize the speech and store it on the hard drive 31. The extension device 200 could then be modified by either (1)(I) having the display 210 also indicate that there is E-mail, or 1 (ii) having the display only indicate that there is E-mail and (2)(I) having the keypad 210 also have a button for "E-mail Playback" or (2)(ii) replacing the three buttons 220, 222 and 224 with an "E-mail Playback" button, respectively.

What is claimed is:

1. In combination, an extension device and a computer system capable of operating in any selected one of at least two states of power management, namely a normal operating state in which code is executed normally by said computer system and an off state, said computer system comprising:
a central processing unit (CPU) capable of executing application program code and operating system code;
a memory for storing an application program which can perform at least one software function,
a modem in circuit communication with said CPU and a telephone line, said modem being operative to encode said at least one software function to first tone signals and transfer said first tone signals onto said telephone line, said modem being further operative to decode second tone signals received from said telephone line and transfer said first tone signals in response thereto, said second tone signals being operative to control said at least one software function,
when executed by said CPU, said application program being operative to control said modem to (1) encode said at least one software function and (2) decode said second tone signals,
said extension device comprising:
user operable keypad for inputting command signals corresponding to said at least one software function,
a display for visually displaying to the user information related to the at least one function performed by said software,
a signal generator coupled to said telephone line for generating said second tone signals,
a signal decoder coupled to said telephone line for decoding said first tone signals to a format which can be used by a controller,
said controller coupled to and controlling said keypad, said display, said signal generator and said signal decoder, said controller and said signal generator being responsive to said command signals and operative to convert said command signals to said second tone signals, said controller and said signal decoder being operative to decode said first tone signals to control said extension device to operate in accordance with said at least one software function.

2. The combination of claim 1, wherein said extension device further includes a speaker for producing sounds representative of a speaker audio signal which is generated by said microcontroller when receiving audio signals from said telephone line.

3. The combination of claim 1, wherein said application program and said modem are operative to automatically answer an incoming phone call when a ring signal is present on said telephone line, play a pre-recorded greeting and store an incoming message as digitized audio signals in said memory when said system is in said normal operating state, and said at least one software function includes playing back said incoming message.

4. The combination of claim 1, wherein said at least one software function includes at least one audio function and said application program is operative to store digitized audio signals corresponding to said audio function in said memory, said extension device further includes a speaker for producing sounds representative of a speaker audio signal, and said keypad including a button which when depressed said controller sends a control tone signal to said computer system which is decoded by said modem and in response thereto said modem sends audio signals representing said digitized audio signals, said controller being operative to generate said speaker audio signal when receiving said audio signals such that said speaker produces sounds corresponding to said digitized audio signals.

5. The combination of claim 1, wherein said extension device further includes a microphone coupled to said controller for producing a microphone audio signal representative of user-generated sounds.

6. The combination of claim 1, wherein said extension device further includes a read only memory coupled to said controller for storing control programs which are accessed by said controller to control said keypad, said display, said signal generator and said signal decoder to operate in accordance with said at least one software function.

7. The combination of claim 2, wherein said application program and said modem are operative to automatically answer an incoming phone call when a ring signal is present on said telephone line, play a pre-recorded greeting and store an incoming message as digitized audio signals in said memory when said system is in said normal operating state, said program being further operative to control said modem to encode a tone signal which indicates a number of incoming messages recorded, said controller being operative to decode said tone signal to control said display to indicate said number of recorded incoming messages, and said keypad including a message playback button which when depressed said controller sends a control tone signal to said computer system which is decoded by said modem and in response thereto said modem sends audio signals representing a recorded incoming message which is then played on said speaker.

8. The combination of claim 2, wherein said application program is operative to convert an E-mail message from a text format to digitized audio signals when said system is in said normal operating state, said digitized audio signals being stored in said memory, said program being further operative to control said modem to encode a tone signal which indicates a number of E-mail messages stored in said memory, said controller being operative to decode said tone signal to control said display to indicate said number of E-mail messages, and said keypad including an E-mail playback button which when depressed said controller sends a control tone signal to said computer system which is decoded by said modem and in response thereto said modem sends audio signals representing a stored E-mail message which is then played on said speaker.

9. An extension device for use with a computer system capable of operating in any selected one of at least two states of power management, namely a normal operating state in which code is executed normally by said computer system and an off state, the system having software which can perform at least one software function, said extension device comprising:

a phone line interface coupled to a telephone line for communicating first tone signals and second tone signals with said computer system via said telephone line, said first tone signals corresponding to said at least one software function and said second tone signals being operative to control said at least one software function, user operable keypad for inputting command signals related to the said at least one software function, a display for visually displaying to the user information related to at least one function performed by said software, a signal generator for generating said second tone signals, a signal decoder for decoding said first tone signals to a format which can be used by a controller, said controller coupled to and controlling said keypad, said display, said signal generator and said signal decoder, said controller and said signal generator being responsive to said command signals and operative to convert said command signals to said second tone signals, said controller and said signal decoder being operative to decode said first tone signals to control said extension device to operate in accordance with said at least one software function.

10. The combination of claim 9, wherein said extension device further includes a speaker for producing sounds representative of a speaker audio signal which is generated by said microcontroller when receiving audio signals from said telephone line.

11. The extension device of claim 9, wherein said extension device further includes a microphone for producing a microphone audio signal representative of user generated sounds.

12. The extension device of claim 9, wherein said extension device further includes a read only memory coupled to said controller for storing control programs which are accessed by said controller to control said keypad, said display, said signal generator and said signal decoder to operate in accordance with said at least one software function.

13. The extension device of claim 9, wherein said at least one software function includes at least one audio function and said application program is operative to store digitized audio signals corresponding to said audio function in a memory of said computer system, said extension device further includes a speaker for producing sounds representative of a speaker audio signal, and said keypad including a button which when depressed said controller sends a control tone signal to said computer system which is decoded and in response thereto said computer system sends audio signals representing said digitized audio signals, said controller being operative to generate said speaker audio signal when receiving said audio signals such that said speaker produces sounds corresponding to said digitized audio signals.

14. The extension device of claim 10, wherein said application program is operative to record an audio message and store said recorded message as digitized audio signals in a memory of said computer system, said controller being operative to decode said tone signal to control said display to indicate said number of recorded incoming messages, and said keypad including a message playback button which when depressed said controller sends a control tone signal to said computer system which is decoded and in response thereto said computer system sends audio signals representing said recorded message which is then played on said speaker of said extension device.

15. The extension device of claim 10, wherein said application program is operative to convert an E-mail message from a text format to digitized audio signals which are stored in a memory of said computer system, said controller being operative to decode said tone signal to control said display to indicate said number of E-mail messages, and said keypad including an E-mail playback button which when depressed said controller sends a control tone signal to said computer system which is decoded and in response thereto said computer system sends audio signals representing a stored E-mail message which is then played on said speaker of said extension device.

* * * * *